US012085882B2

(12) United States Patent
Fujibayashi et al.

(10) Patent No.: US 12,085,882 B2
(45) Date of Patent: Sep. 10, 2024

(54) DRAWING APPARATUS AND RECORDING APPARATUS

(71) Applicant: CANON KABUSHIKI KAISHA, Tokyo (JP)

(72) Inventors: Mitsuyuki Fujibayashi, Kanagawa (JP); Gakushi Tanaka, Kanagawa (JP); Toru Yada, Kanagawa (JP); Yuji Kagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/344,606

(22) Filed: Jun. 29, 2023

(65) Prior Publication Data

US 2023/0341809 A1 Oct. 26, 2023

Related U.S. Application Data

(63) Continuation of application No. 17/670,068, filed on Feb. 11, 2022, now Pat. No. 11,733,640.

(30) Foreign Application Priority Data

Feb. 17, 2021 (JP) ................................ 2021-023459

(51) Int. Cl.
*G03G 21/16* (2006.01)
*B65H 1/00* (2006.01)
(Continued)

(52) U.S. Cl.
CPC ......... *G03G 21/1623* (2013.01); *B65H 1/266* (2013.01); *B65H 9/004* (2013.01);
(Continued)

(58) Field of Classification Search
CPC ............... G03G 21/16; G03G 21/1623; G03G 2221/16; G03G 2221/1672; G03G 2221/1684; B65H 1/04; B65H 1/266; B65H 9/004; B65H 31/02; B65H 31/20; B65H 2402/32; B65H 2402/33; B65H 2402/52;
(Continued)

(56) References Cited

U.S. PATENT DOCUMENTS 8,203,723 B2 6/2012 Matsumoto .............. H04N 1/04
8,449,210 B2 5/2013 Noguchi ....................... 400/692
(Continued)

FOREIGN PATENT DOCUMENTS

JP H04-39259 2/1992
JP 2008-287247 11/2008

*Primary Examiner* — Sophia S Chen
(74) *Attorney, Agent, or Firm* — Venable LLP

(57) ABSTRACT

Disclosed is a drawing apparatus including: a base member; and a drawing member that is attached so as to be capable of being drawn and pressed in a reciprocating direction with respect to the base member, wherein the base member has a couple application mechanism that applies a couple for correcting skewing of the drawing member with respect to the reciprocating direction to the drawing member as a reaction of a force by which the drawing member is pressed, and wherein the couple application mechanism is configured so that a distance between action lines of two forces generating the couple becomes large as a pressing amount of the drawing member with respect to the base member increases.

16 Claims, 17 Drawing Sheets

(51) Int. Cl.

| | |
|---|---|
| ***B65H 1/26*** | (2006.01) |
| ***B65H 9/00*** | (2006.01) |
| ***B65H 31/02*** | (2006.01) |
| ***B65H 31/20*** | (2006.01) |

(52) U.S. Cl.
CPC ............. *B65H 31/02* (2013.01); *B65H 31/20* (2013.01); *B65H 2402/32* (2013.01); *B65H 2402/441* (2013.01); *B65H 2405/32* (2013.01); *B65H 2801/03* (2013.01); *G03G 2221/1684* (2013.01)

(58) Field of Classification Search
CPC .......... B65H 2402/53; B65H 2402/441; B65H 2405/12; B65H 2405/32; B65H 2405/111; B65H 2405/324; B65H 2801/03; B41J 2/01; H04N 1/00525; H04N 1/00533
See application file for complete search history.

(56) References Cited

U.S. PATENT DOCUMENTS

| | | | | |
|---|---|---|---|---|
| 10,958,806 | B2 | 3/2021 | Ishihara et al. | H04N 1/1039 |
| 11,006,010 | B2 | 5/2021 | Ota et al. | B41J 29/393 |
| 11,124,004 | B2 | 9/2021 | Umehara et al. | B41J 29/38 |
| 2005/0052518 | A1 | 3/2005 | Kagami | B41J 13/10 |
| 2021/0252883 | A1 * | 8/2021 | Saito | B65H 31/20 |
| 2022/0111671 | A1 | 4/2022 | Tokuyama et al. | B41J 29/02 |
| 2022/0258504 | A1 | 8/2022 | Kagami et al. | B41J 29/13 |
| 2022/0263960 | A1 | 8/2022 | Nakashima et al. | H04N 1/00 |

* cited by examiner 50
56(R)
56(L)
35
Dy
52(R)
34(R)
52(L)
34(L)
P
F1
F2
Da
30
BACK/REAR/BACK END
LEFT
X
RIGHT
Y
NEAR/FRONT/TIP END

DRAWING APPARATUS AND RECORDING APPARATUS

This application is a continuation of application Ser. No. 17/670,068 filed Feb. 11, 2022, and claims priority under 35 U.S.C. § 119 to Japan Application JP 2021-023459 filed in Japan Feb. 17, 2021; and the contents of all of which are incorporated herein by reference as if set forth in full.

BACKGROUND OF THE INVENTION

Field of the Invention

The present invention relates to a drawing apparatus that is capable of performing reciprocation to draw and press a drawing member with respect to a base member, and a recording apparatus including the drawing apparatus.

Description of the Related Art

In a recording apparatus that records an image on a recording material, recording unit and conveying unit for conveying a recording material, on which an image is recorded, are provided. A recording material, on which an image has been recorded, is discharged to the outside of the recording apparatus by the conveying unit. At the front portion or the like of the recording apparatus, a paper discharging tray that serves as a portion to receive the discharged recording material is generally provided. Since the paper discharging tray receives maximum-sized recording materials among paper sizes printable by the recording apparatus, the paper discharging tray is configured to protrude from the apparatus main body of the recording apparatus during a recording operation in many cases.

Meanwhile, when only the paper discharging tray protrudes from the apparatus main body of the recording apparatus when the recording apparatus is not in use, the protruded portion unnecessarily occupies installation space, obstructs conveyance, or causes damage depending on the circumstances and is therefore formed to be accommodatable in most cases.

As means for changing the posture of the paper discharging tray depending on whether the paper discharging tray is in use or is not in use, a rotating movement system, a linear movement system, or a rotating linear movement system in which the rotating movement system and the linear movement system are combined together is available. In the linear movement system, the paper discharging tray is guided so as to linearly move from a state, in which the paper discharging tray is accommodated in the apparatus main body of the recording apparatus, toward a prescribed direction outside the apparatus main body of the recording apparatus. Further, the paper discharging tray is guided so as to linearly move toward a prescribed direction inside the apparatus main body of the recording apparatus in a state in which the paper discharging tray is protruded from the apparatus main body of the recording apparatus. Thus, the paper discharging tray is capable of being, as required, inserted into and extracted from the apparatus main body of the recording apparatus. The paper discharging tray is capable of being drawn from the apparatus main body when image recording is performed and capable of being pressed into the apparatus main body when the apparatus is not in use.

The paper discharging tray of the linear movement system is structured by a substantially rectangular plate-shaped component. Generally, for the rectangular plate-shaped component to be inserted into and extracted from the apparatus main body, rail portions are provided so that sliding of the paper discharging tray is restricted on the side thereof with respect to the apparatus main body of the recording apparatus. In order to allow manufacturing variations in components, it is necessary to provide looseness. For example, when the length of the rails is not sufficiently secured in a state in which the looseness is provided, there is a case that the paper discharging tray is inclined with respect to the apparatus main body of the recording apparatus, thereby causing a significant increase in a sliding resistance force during the insertion and extraction of the paper discharging tray. If the paper discharging tray is inserted and extracted manually at this time, a large operating force is required or the change of a hand to grip the paper discharging tray or the like is required. As a result, operability may be degraded.

In view of this, Japanese Patent Application Laid-open No. H04-39259 proposes a slide-type paper discharging tray capable of improving operability in drawing and pressing a paper discharging tray. Further, Japanese Patent Application Laid-open No. 2008-287247 proposes a drawing mechanism capable of drawing a unit from an apparatus main body with a small resistance load.

SUMMARY OF THE INVENTION

The present invention has an object of providing a technology capable of more effectively improving operability in pressing a drawing member into a base member with a simpler configuration.

In order to solve the above problem, a drawing apparatus according to the present invention includes:

- a base member; and
- a drawing member that is attached so as to be capable of being drawn and pressed in a reciprocating direction with respect to the base member,
- wherein the base member has a couple application mechanism that applies a couple for correcting skewing of the drawing member with respect to the reciprocating direction to the drawing member as a reaction of a force by which the drawing member is pressed, and
- wherein the couple application mechanism is configured so that a distance between action lines of two forces generating the couple becomes large as a pressing amount of the drawing member with respect to the base member increases.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

A recording apparatus 100 according to an embodiment of the present invention shows an example in which the present invention is applied to so-called an inkjet printer that ejects ink serving as an image recording liquid on a recording material to record an image (liquid ejection system). A recording apparatus to which the present invention is applicable is not limited to an image recording apparatus (image forming apparatus) having a liquid ejection system, and the present invention may be applied to, for example, the housing configuration of an image recording apparatus (laser printer) having an electrophotographic system. Note that "recording" includes not only forming significant information items such as characters and graphics but also widely forming images, designs, patterns, or the like on a recording medium regardless of their significance/non-significance or performing the processing of a recording medium and is not limited to matters actualized so as to be visually perceivable by a human. Further, a sheet material (paper) is assumed as a "recording medium" (recording material) in the present embodiment, but fabric, a plastic film, or the like may be used instead.

Figure 1:
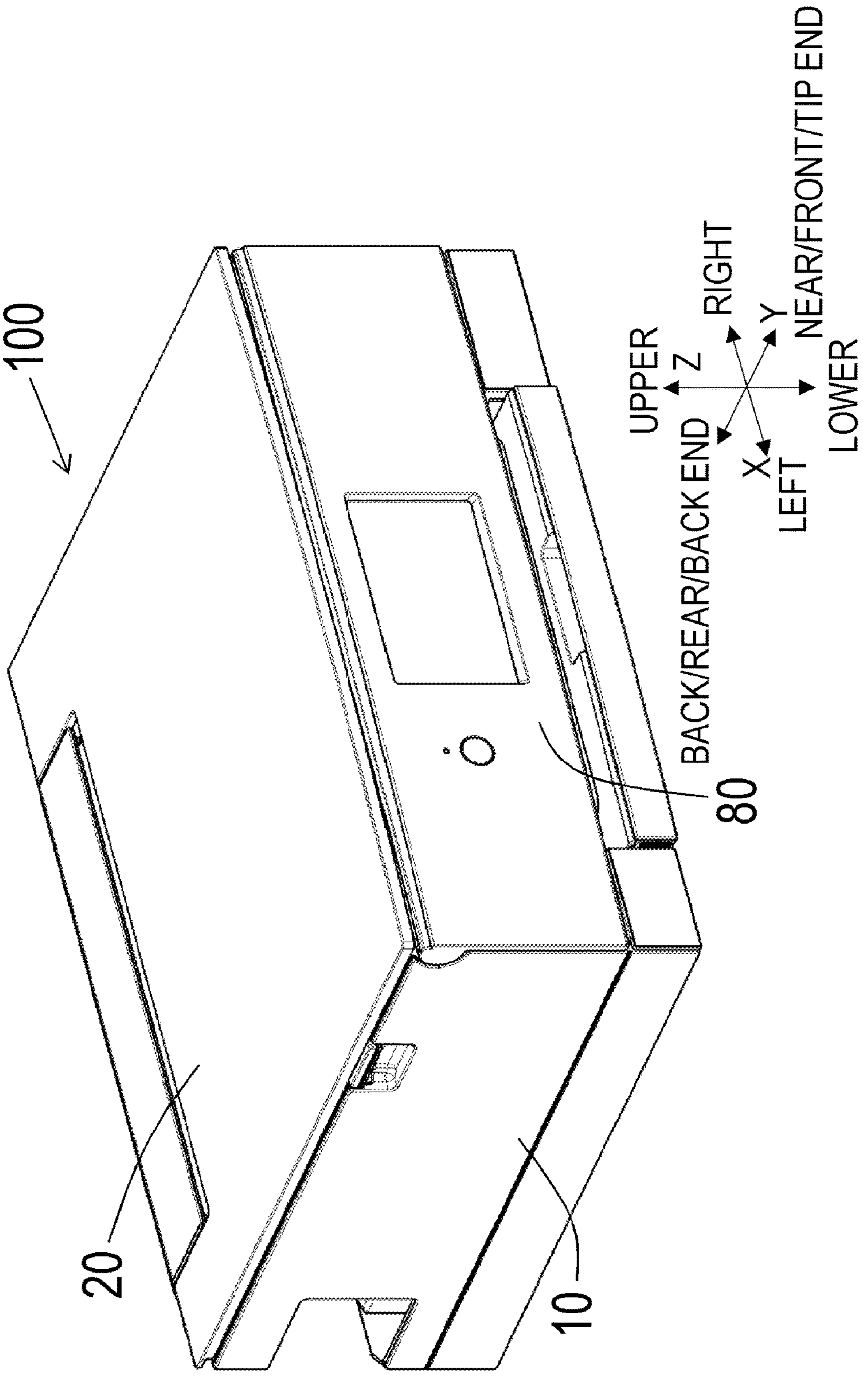
FIG. 1 is a perspective view showing the schematic configuration of a recording apparatus.

FIG. 1 is a schematic view showing the recording apparatus 100 including a drawing apparatus according to the present embodiment. Among arrow directions shown in FIG. 1, an apparatus width direction will be called an X-direction, an apparatus depth direction will be called a Y-direction, and an apparatus height direction will be called a Z-direction. Further, as indicated by arrows in FIG. 1, the X-direction will be expressed as a right direction and a left direction, the Y-direction will be expressed as a near/front/tip end direction and a back/rear/back end direction, and the Z-direction will be expressed as an upper direction and a lower direction. Further, in the width direction, the left direction will be called a first width direction, and the right direction will be called a second width direction in some cases. The respective directions are defined with the installation surface of the recording apparatus 100 as a reference. For example, when the recording apparatus 100 is installed on a horizontal surface in its normally-expected installation state, the Z-direction that is a height direction corresponds to a vertical direction and the X and Y directions correspond to a horizontal direction. The same applies to arrows X, Y, and Z in other figures.

The recording apparatus 100 roughly includes, as exterior portions, an exterior housing portion 10 that covers an image recording unit or the like with lateral surfaces and an exterior housing portion 20 that covers an upper surface. The upper-surface exterior housing portion 20 has a rotating shaft about the X-direction near a rear portion in the Y-direction and an upper end in the Z-direction of the recording apparatus 100, is configured to open on a front side in the Y-direction and an upper end side in the Z-direction of the apparatus, and enables maintenance or the like inside the apparatus. Further, the recording apparatus 100 has an operating panel 80 at the front of the apparatus. The operating panel 80 has a rotating shaft about the X-direction near a front portion in the Y-direction and an upper end in the Z-direction of the recording apparatus 100 and capable of being rotated and held at an arbitrary angle.

The recording apparatus 100 receives power from a commercial power supply via a power cable not shown and is capable of activating according to an arbitrary method, for example, a mechanical switch or a communication command from a computer connected in a wired or wireless fashion. The recording apparatus 100 is capable of performing a printing operation according to a printing command from a computer or the operating panel 80 in its activating state.

Figure 2:
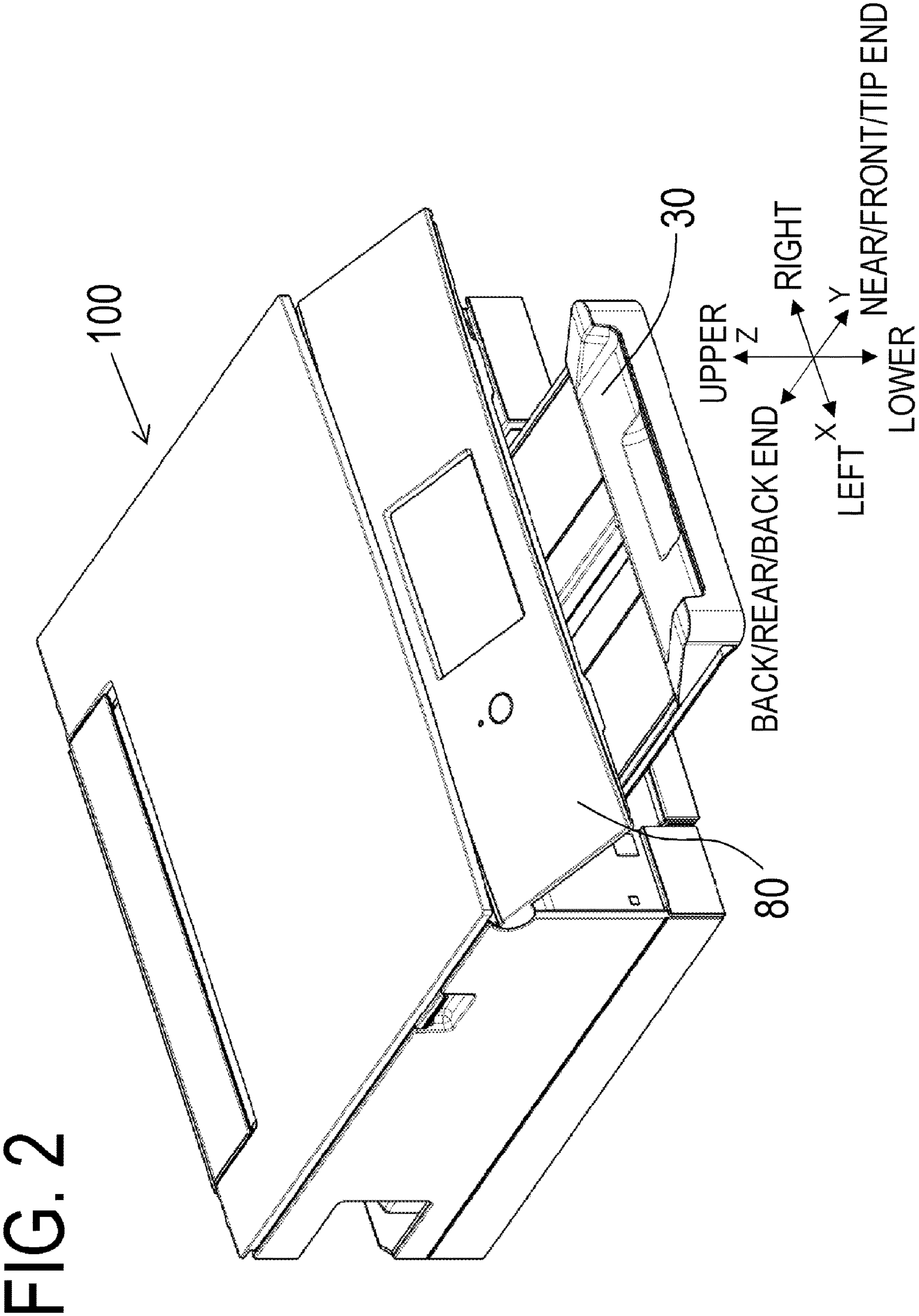
FIG. 2 is a perspective view showing the schematic configuration of the recording apparatus when performing printing.

FIG. 2 shows the recording apparatus 100 during printing (image recording). As shown in FIG. 2, space in which an image-recorded paper is discharged is secured in a state in which the operating panel 80 is open. Further, on a lower side in the Z-direction of the paper discharging space, a paper discharging tray 30 serving as a drawing member is configured to be advanceable and retractable in the Y-direction corresponding to a prescribed reciprocating direction with respect to an apparatus main body of the recording apparatus 100. FIG. 2 shows a state in which the paper discharging tray 30 is drawn from the apparatus main body and capable of receiving a recording material such as a discharged paper.

Figure 3:
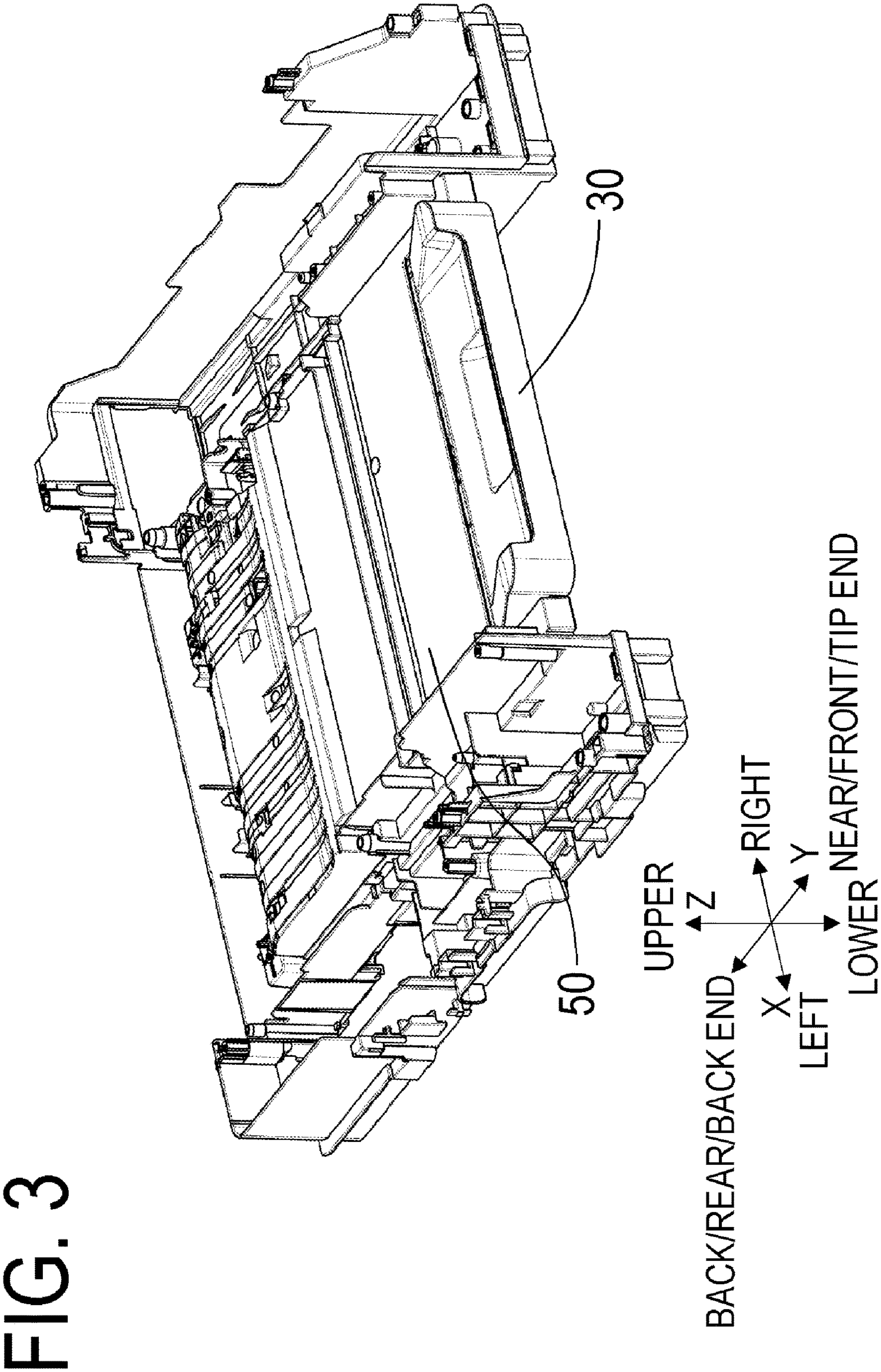
FIG. 3 is a perspective view showing the schematic configurations of a base member and a paper discharging tray in an accommodated state.
Figure 4:
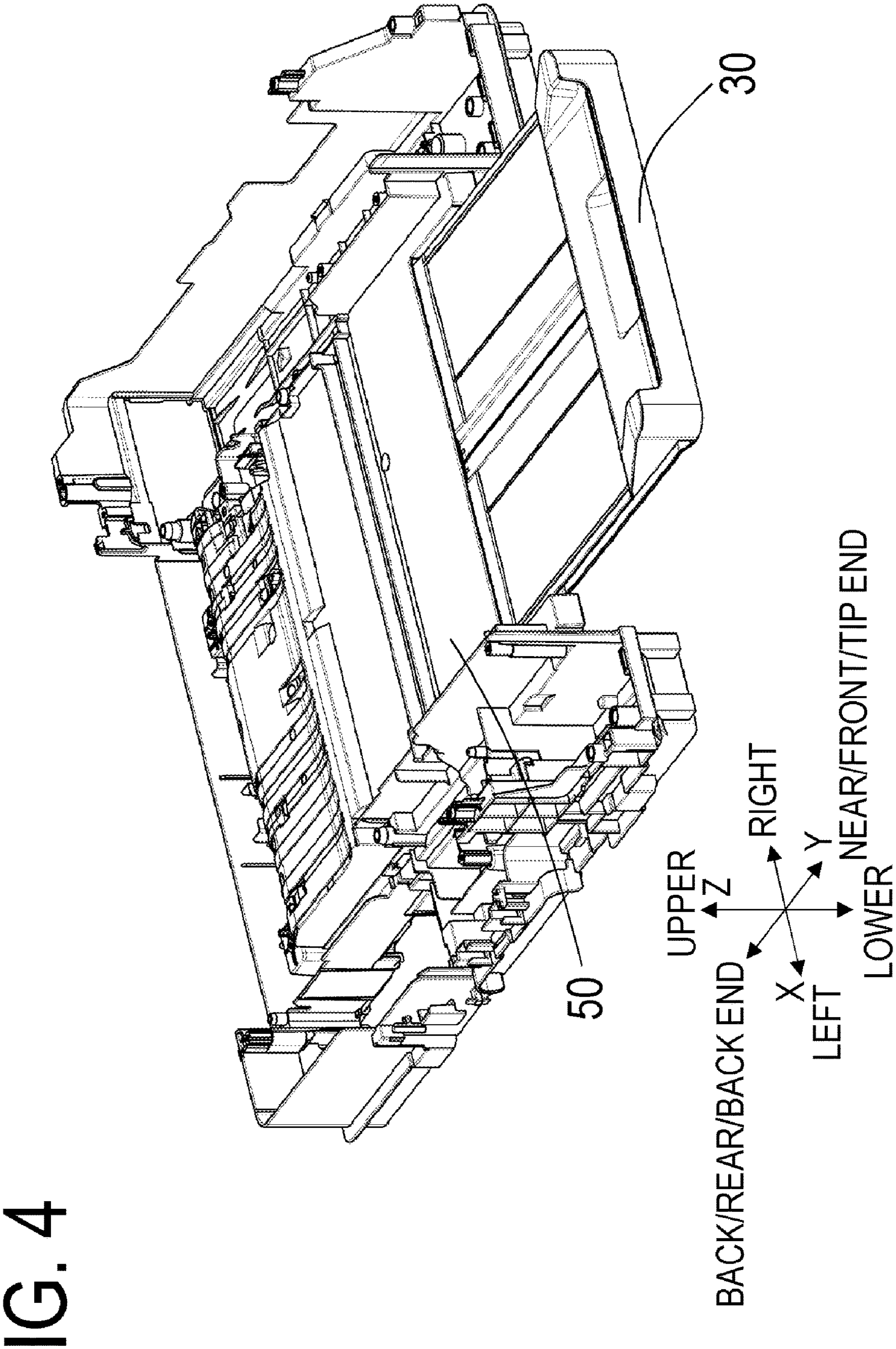
FIG. 4 is a perspective view showing the schematic configurations of the base member and the paper discharging tray in a drawn state.

FIGS. 3 and 4 are perspective views showing only the paper discharging tray 30 and a base member 50 supporting the paper discharging tray 30 that are removed from the recording apparatus 100. FIG. 3 shows a state in which the paper discharging tray 30 is accommodated inside the recording apparatus 100. FIG. 4 shows a state in which the paper discharging tray 30 is drawn from the recording apparatus 100 during printing or the like. By performing reciprocation in the Y-direction, the paper discharging tray 30 is configured to be capable of taking a pressed state (an accommodated state or an unused state) in which the paper discharging tray 30 is accommodated in the prescribed accommodating portion of the apparatus main body and a drawn state (a stackable state or a used state) in which the paper discharging tray 30 is drawn from the accommodating portion and protruded from the front of the apparatus main body. Among movement directions in the reciprocation of the paper discharging tray 30, a movement direction in which the paper discharging tray 30 moves from the pressed state to the drawn state will be called a drawing direction, and a direction opposite to the drawing direction will be called a pressing direction.

Figure 5:
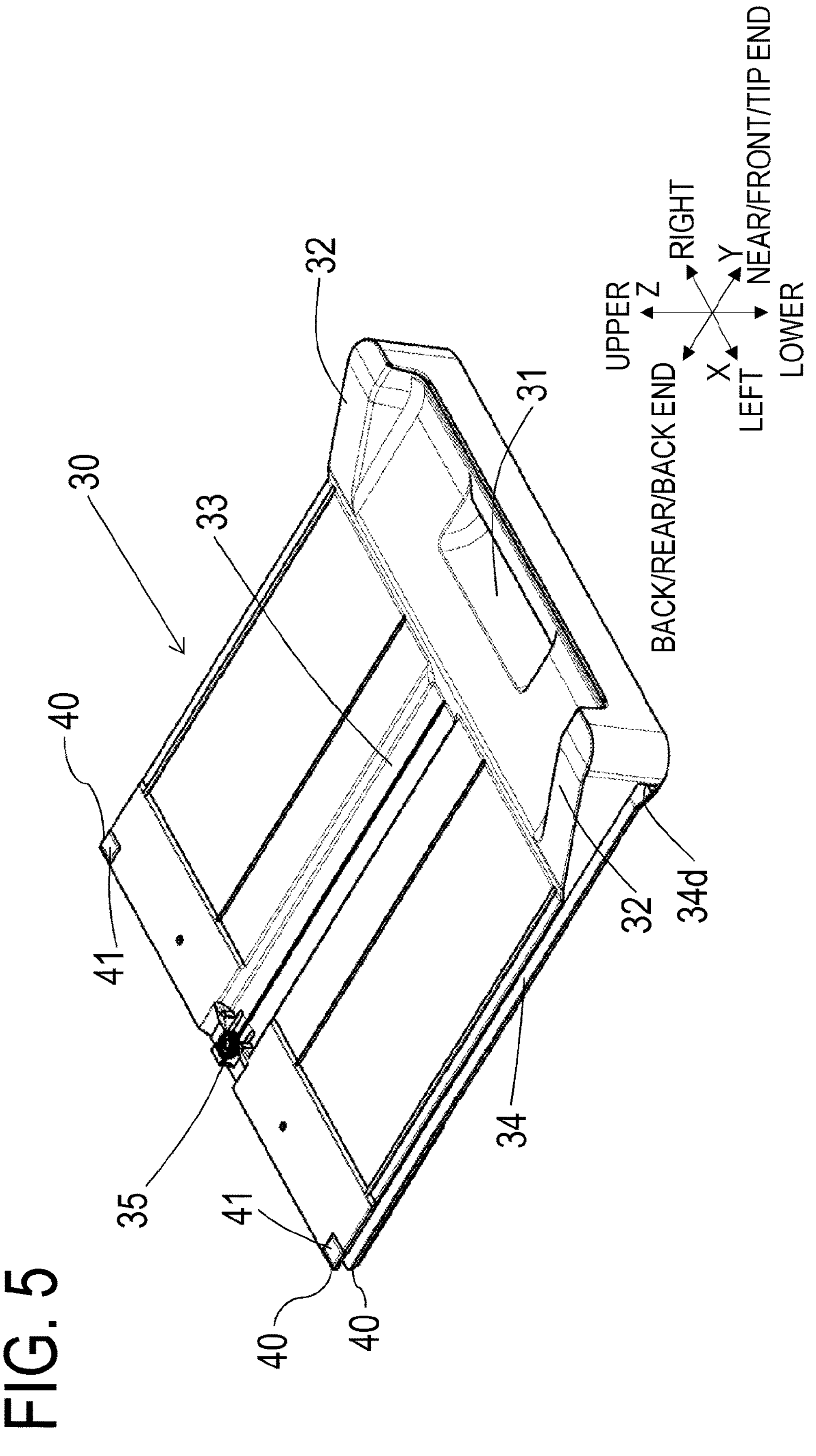
FIG. 5 is a perspective view showing the schematic configuration of the paper discharging tray.

FIG. 5 is an appearance perspective view showing the schematic configuration of the paper discharging tray 30. The paper discharging tray 30 has a substantially rectangular plate shape extending in both the X-direction and the Y-direction. Further, the paper discharging tray 30 is symmetrical about a central axis line passing through a center in the X-direction with the Y-direction as a longitudinal direction. The paper discharging tray 30 includes a handle 31 for hooking a finger when the paper discharging tray 30 is drawn from the recording apparatus 100 at an end on its front side. Protruded portions 32 having a slope shape are formed at both right and left ends of the handle 31, and a discharging tip end side is made higher than a discharging back side for a recording material such as a paper to prevent a discharged paper from jumping out from the recording apparatus 100. Further, the portion between the right and left protruded portions 32 is made lower than the protruded portions 32, whereby a discharged paper may be supported in a substantially square U-shape when seen from the near side of the recording apparatus 100. Thus, even when the discharging tip end side of a paper jumps out from the near tip end side of the paper discharging tray, the discharging tip end side of the paper is supported in a substantially square U-shape and the paper may be prevented from sagging downward with the strength of its stiffness. Moreover, a discharged paper is supported in a substantially square U-shape, and the discharging tip end of a paper that is to be next printed is discharged substantially horizontally, whereby the printing surface of an uppermost paper sheet among discharged paper sheets hardly rubs against the tip end of a paper sheet that is being discharged.

Further, the paper discharging tray 30 includes a recessed portion 33 recessed with respect to a surrounding shape from a portion near the back of the handle 31 to the back of the recording apparatus 100.

Figure 6:
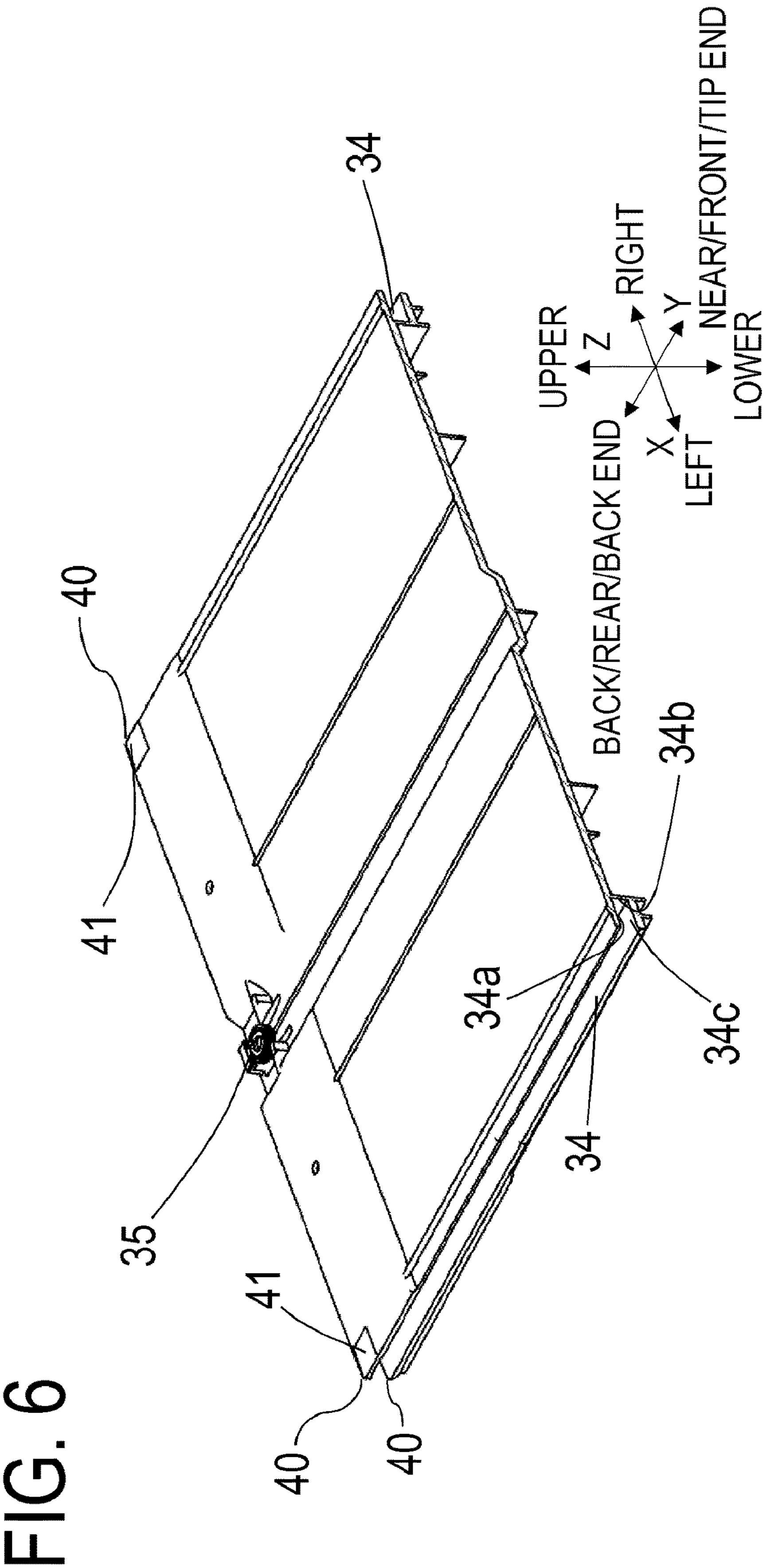
FIG. 6 is a partially cross-sectional perspective view showing the schematic configuration of the paper discharging tray.

FIG. 6 is a perspective view of the paper discharging tray 30 showing a cross section obtained when the near side of the paper discharging tray 30 is cut off. The paper discharging tray 30 has recessed portions 34 recessed inward in the width direction on its both lateral surfaces. Each of the recessed portions 34 has a substantially U-shaped cross section and is formed over almost the entire region in the depth direction (Y-direction) of the paper discharging tray 30. Here, the right and left lateral surfaces of the paper discharging tray 30 have an inverted shape with respect to a center in the width direction and are the same in the above and the following descriptions. The back side of the recessed portion 34 is penetrated in the substantially U-shape, and the near side thereof is sealed by a surface **34*d* directed to the back side in the Y-direction (FIG. 5). The substantially U-shaped cross-section of the recessed portion 34 is constituted by the three sides of wall surfaces that serve as guided surfaces, i.e., an upper surface 34*a* that is an upper wall surface, a lateral surface (recessed-portion bottom surface) 34*b* that is a lateral wall surface, and a lower surface 34*c*** that is a lower wall surface.

Figure 13:
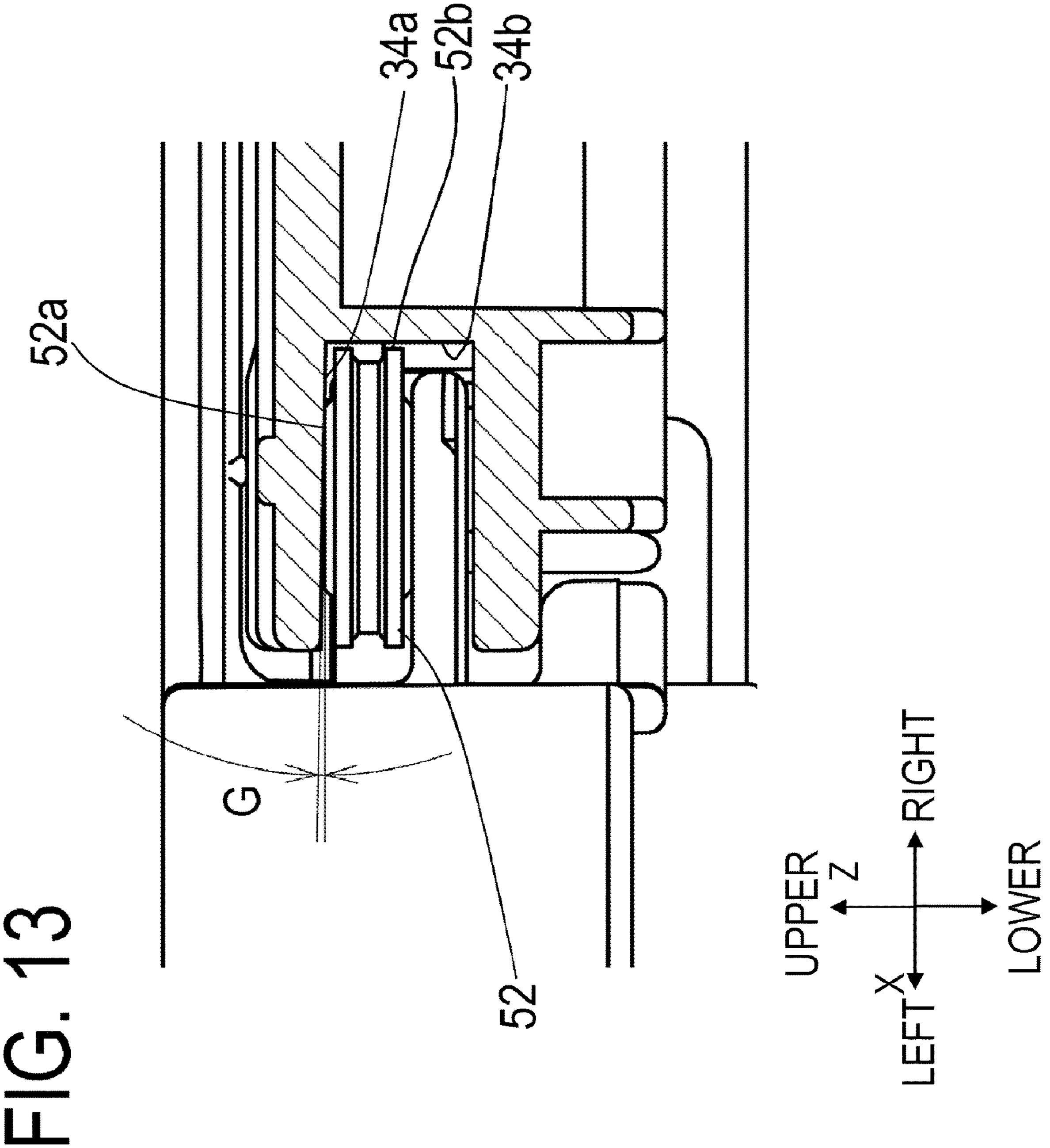
FIG. 13 is a partially cross-sectional view showing the outline of the configuration of the engagement between the paper discharging tray and the base member.

Here, as shown in FIG. 13, the upper surface **34*a* of the recessed portion 34 extends so as to be inclined by a slight angle G in a direction in which the opening width (the height in the Z-direction) of the recessed portion 34 increases from the boundary between the upper surface 34*a* and the lateral surface 34*b* to the lateral side of the paper discharging tray 30. In the recessed portion 34, a contact roller 52 (a first roller or a second roller) that is provided in the base member 50 and will be described later is arranged. The lateral surface 34*b* (a first peripheral surface contact portion or a second peripheral surface contact portion) of the recessed portion 34 is opposed to an outer peripheral contact surface 52*b* (a first outer peripheral surface or a second outer peripheral surface) of the contact roller 52 in the width direction so as to be capable of contacting the same. Further, the upper surface 34*a* (a first end surface contact portion or a second end surface contact portion) contacts an upper ring-shaped end surface 52*a* (a first ring-shaped end surface or a second ring-shaped end surface) in the rotating axis line (the first rotating axis line and the second rotating axis line) of the contact roller 52. The upper surface 34*a* contacts the contact roller 52 at all times regardless of the relative position of the paper discharging tray 30 with respect to the base member 50. In the left recessed portion 34 in the width direction of the paper discharging tray 30 shown in FIG. 13, the upper surface 34*a* is inclined in a direction orthogonal to the rotating axis line of the contact roller 52 so that a downstream side thereof has a higher contact degree with respect to the ring-shaped end surface 52*a* than an upstream side thereof in the recessed direction (right direction) of the recessed portion 34. The right recessed portion 34 in the width direction of the paper discharging tray 30 is symmetrical and configured to be the same as the left recessed portion 34**.

The contact portion between the upper surface **34*a* and the contact roller 52 forms a part of a couple application mechanism that applies a couple for correcting skewing with respect to the reciprocating direction to the paper discharging tray 30 as the reaction of a force by which the paper discharging tray 30 is pressed (the details of which will be described later). The right and left recessed portions 34 correspond to first and third contacted portions and first and second guided surfaces in the present invention. Further, the contact portions between a pair of the right and left contact rollers 52 and the right and left recessed portions 34 correspond to first and third couple application portions in the present invention. Further, the pair of the right and left contact rollers 52** correspond to first and third contact portions, first and second restriction guiding portions (first and second restriction portions), and first and second guiding portions in the present invention.

Further, the paper discharging tray 30 includes protruded surfaces 41 protruded from surrounding portions in the Z-direction near right and left rear-end corner portions 40.

Figure 7:
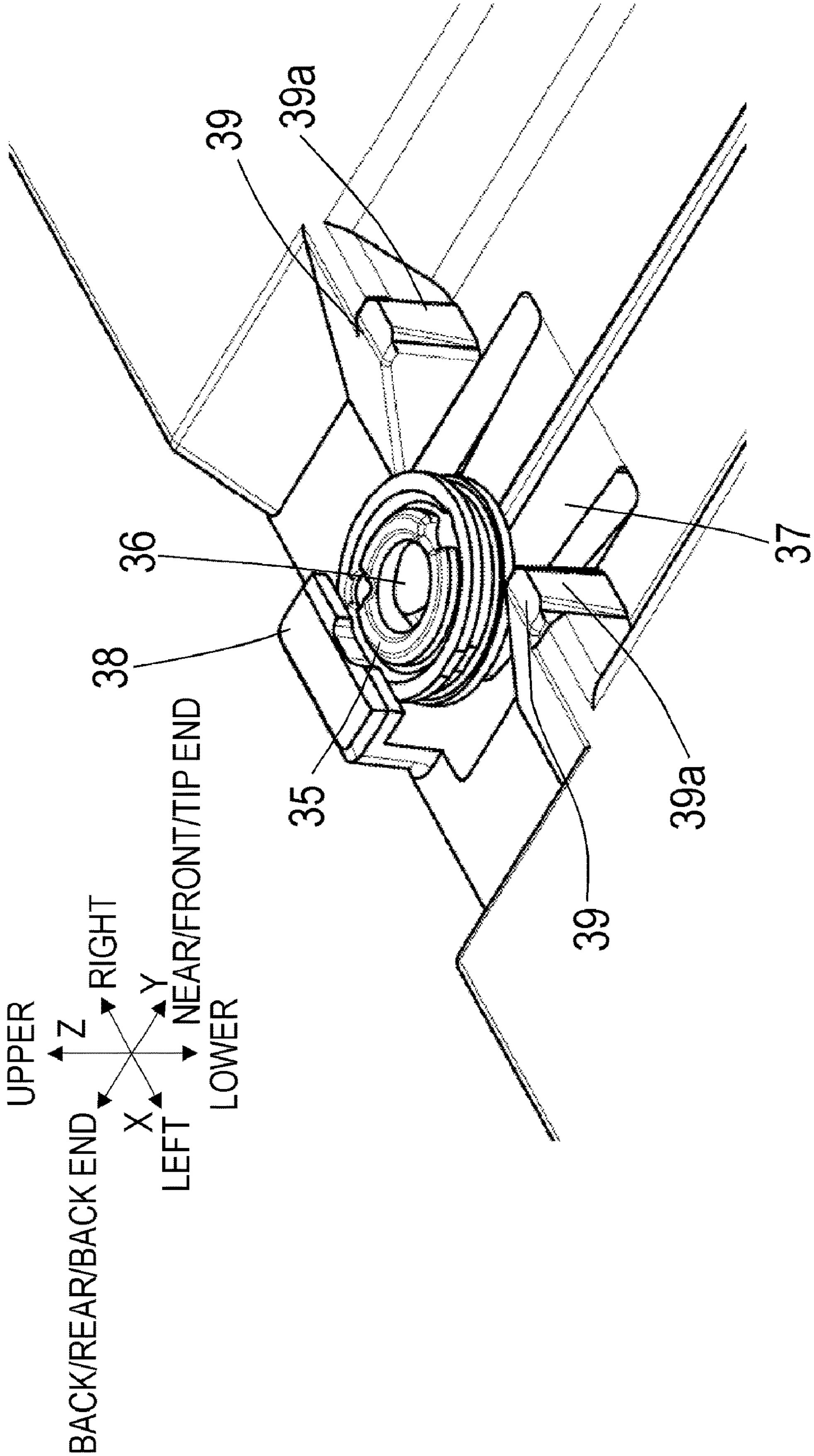
FIG. 7 is a perspective enlarged view showing a schematic configuration near the contact roller of the paper discharging tray.

As shown in FIGS. 5 and 6, the paper discharging tray 30 has a contact roller 35 (third roller) on its central back side in the width direction. The contact roller 35 is arranged at the back of the recessed portion 33. FIG. 7 is a perspective view showing the periphery of the contact roller 35 in an enlarged fashion. The contact roller 35 is arranged to be rotatable about a rotating axis line (third rotating axis line) extending in a vertical direction with a shaft portion 36 integrally provided on the paper discharging tray 30. The outer peripheral contact surface of the contact roller 35 is opposed to a pair of wall surfaces 56 provided on the lower surface of a paper stack surface 51 of the base member 50 so as to be capable of contacting the same in the right-and-left width direction.

The contact portions between the pair of wall surfaces 56 and the contact roller 35 form a part of the couple application mechanism that applies a couple for correcting the skewing of the paper discharging tray 30 with respect to the reciprocating direction to the paper discharging tray 30 as the reaction of a force by which the paper discharging tray 30 is pressed (the details of which will be described later). The contact portions between the pair of wall surfaces 56 and the contact roller 35 correspond to second and fourth couple application portions in the present invention. Further, the pair of wall surfaces 56 corresponds to a pair of guiding wall surfaces (first and second guiding wall surfaces), second and fourth contact portions, third restriction guiding portions (third and fourth restriction portions), and third and fourth guiding portions. Further, the contact portions between the contact roller 35 and the pair of wall surfaces 56 correspond to second and fourth contacted portions and third and fourth guided portions in the present invention.

Note that although the positioning relationship between the paper discharging tray 30 and the base member 50 and the operations of the paper discharging tray 30 and the base member 50 are described on the basis of configurations using the contact rollers in the present embodiment, the contact rollers may not be necessarily used as the configurations of the respective contact portions. For example, each of the contact portions between the paper discharging tray 30 and the base member 50 may be replaced by a cylindrical shape, a cylindrical rib shape, or the like that is integrally formed. Further, the shape of the contact portions is not limited to a cylindrical shape, but ribs may be formed into a partially protruded shape to be capable of functioning as the contact portions. Moreover, the contact portions are not limited to a rotatable roller type, but members having a small frictional coefficient that are advantageous in slidability may be fixedly provided and partially formed into a cylindrical or protruded shape as described above to function as the contact portions. The mode of the contact portions of the present invention is not limited to a rotatable roller type as described above but may be arbitrarily set.

As shown in FIG. 7, the shaft portion 36 is formed on the tip end side of a claw shape 37 extending to a back side in the paper discharging tray 30, and the tip end side of the claw shape 37 having a cantilever structure is deformable in the Z-direction. On the deepest back side of the recessed portion 33, an L-shaped hooking portion 38 is integrally formed on the paper discharging tray 30 and functions to prevent the contact roller 35 from coming off the shaft portion 36.

Here, the following configuration is employed as a configuration for making the contact roller 35 rotatable and preventing the separation of the contact roller 35 in an axis line direction with respect to the shaft portion 36. That is, when the contact roller 35 is embedded in the shaft portion 36, the shaft portion 36 is separated in the Z-direction together with the tip end of the claw shape 37 with respect to the hooking portion 38 to make it possible to thrust the contact roller 35 into the paper discharging tray 30 to be stopped and rotatably pivotally support the contact roller 35. Note that protruded portions 39 are provided on both sides in the right-and-left width direction of the claw shape 37, and each of the protruded portions 39 has a surface 39*a* that is perpendicular to the Y-direction and directed to the near side of the apparatus main body of the recording apparatus.

Figure 8:
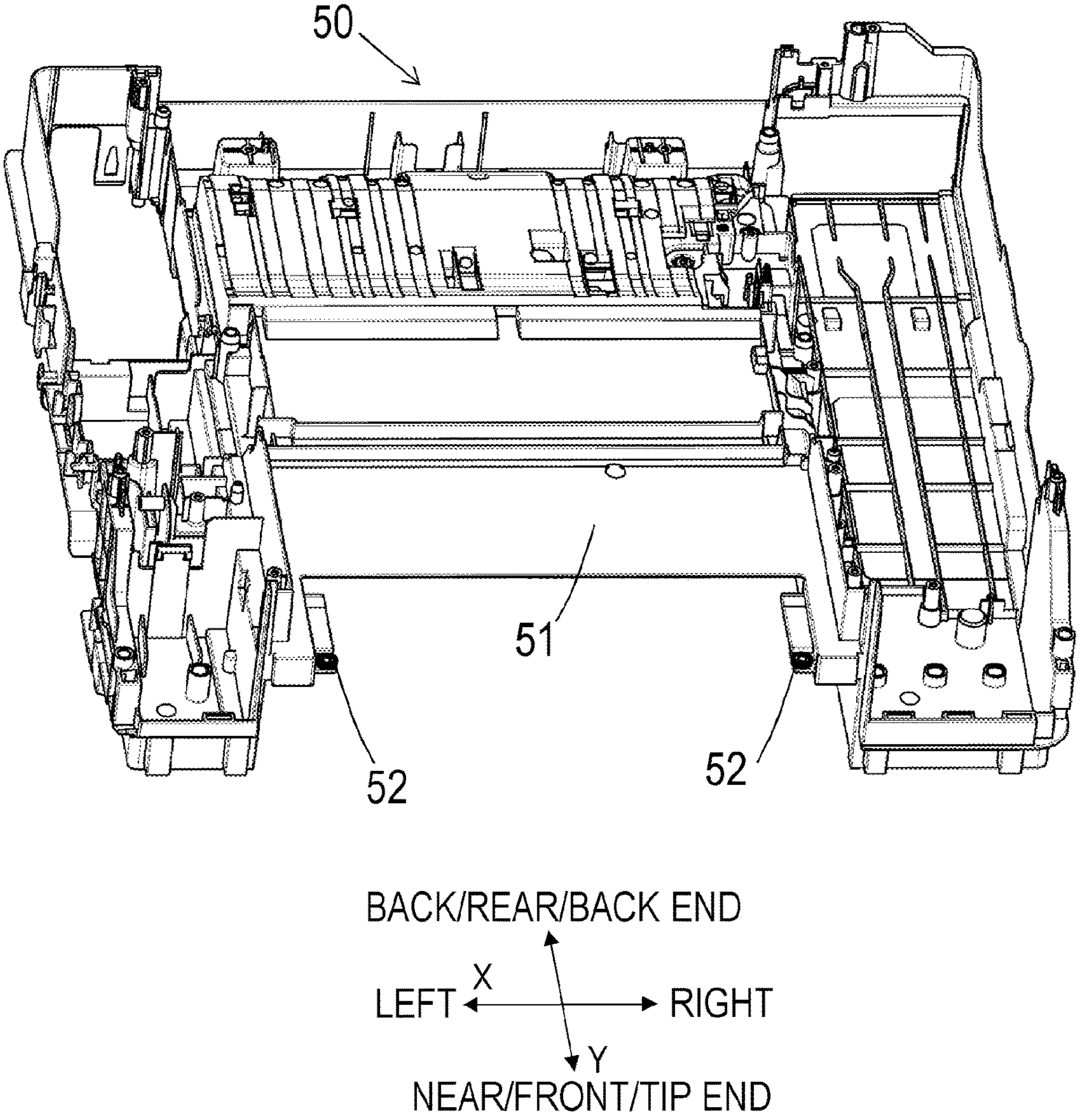
FIG. 8 is a perspective view showing the schematic configuration of the base member.

FIG. 8 is a schematic view showing the base member 50. The base member 50 has the paper stack surface 51 onto which a printed paper (a recording material on which an image is recorded) is discharged. The paper stack surface 51 is the closest to the image recording portion in the Y-direction in the recording apparatus 100. In the base member 50, the apparatus main body near side of the paper stack surface 51 is notched in a substantially rectangular shape. The paper discharging tray 30 is moved (drawn) from the space toward the apparatus main body near side. Thus, the paper stack surface 51 integrally functions not only as the upper surface (stack surface) of the paper discharging tray 30 but also as the paper stack surface (stacking portion) of the recording apparatus 100.

As shown in FIG. 8, the respective contact rollers 52 are provided on the right and left sides of substantially-rectangular notched space on the near side of the base member 50. Here, the mode of contact portions is not limited to a roller type like the above contact portions but may be arbitrarily set. The paper discharging tray 30 is butted against the base member 50 at its both ends and central portion with the configurations of other members, and components having a low frictional coefficient or the like are provided at butted portions. Thus, it is possible to reduce an operating resistance load and improve operability even if an operating force is applied to the paper discharging tray 30 at any operating position to move the same.

Figure 9:
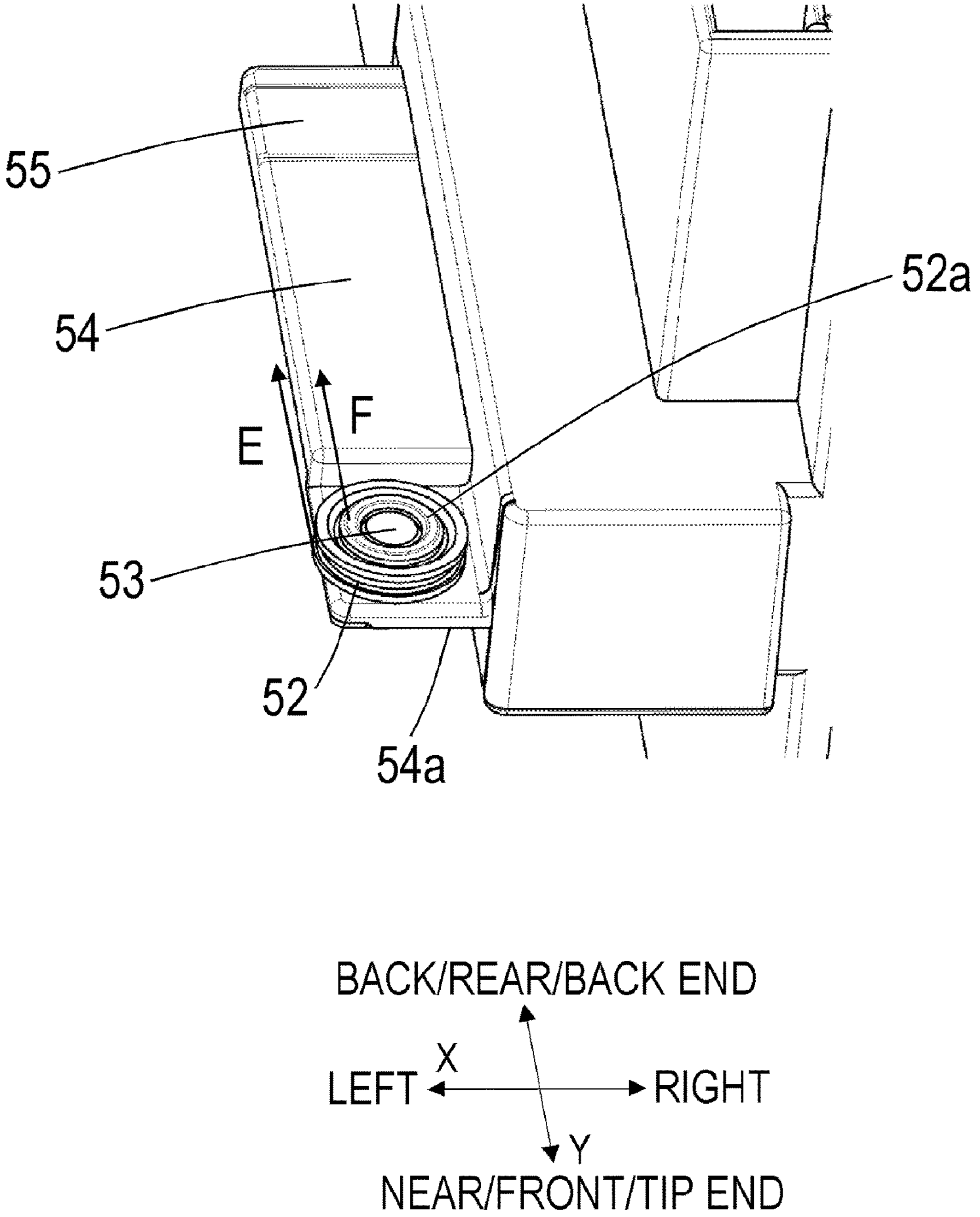
FIG. 9 is a perspective enlarged view showing a schematic configuration near a contact roller of the base member.

FIG. 9 shows the periphery of the right contact roller 52 in an enlarged fashion. Note that the periphery of the left contact roller 52 has an inversion symmetrical shape and the following description contents also apply to the periphery of the left contact roller 52. In FIG. 9, a canopy 54 and a shaft portion 53 are integrally provided on the base member 50. The contact roller 52 is rotatably pivotally supported by the shaft portion 53 extending in the vertical direction. The upper height of a ring-shaped end surface 52*a* that serves as the thrust surface of the contact roller 52 is made higher than the upper tip end height of the shaft portion 53. The canopy 54 has a butted surface 54*a* that is opposed to the surface 34*d* of the recessed portion 34 of the paper discharging tray 30 in the front-and-rear direction of the apparatus on its apparatus main body front surface side. Moreover, the canopy 54 has a protruded surface 55 protruded in the Z-direction on its back side. The protruded surface 55 is made lower than the thrust surface of the contact roller 52 by a slight amount in the Z-direction.

Together with the protruded surfaces 55, the ring-shaped end surfaces 52*a* of the contact rollers 52 become portions that are upwardly butted against the paper discharging tray 30 at both ends in the width direction as parts of a load receiving portion that receives the load of the paper discharging tray 30 in the base member 50. On the other hand, at a central portion in the width direction, the pair of wall surfaces 56 composed of ribs extending in the Y-direction at the center of the lower surface of the paper stack surface 51 that will be described later is downwardly butted against the recessed portion 33 extending in the Y-direction at the center of the upper surface of the paper discharging tray 30. Moreover, at both ends in the width direction, ribs 60 extending in the Y-direction at both ends in the width direction of the lower surface of the paper stack surface 51 that will be described later are downwardly butted against protruded surfaces 41 provided near corner portions at the rear end of the upper surface of the paper discharging tray 30. As described above, the paper discharging tray 30 is butted against the base member 50 at its both ends and central portion, and components having a low frictional coefficient or the like are provided at butted portions. Moreover, the paper discharging tray 30 is butted against the base member 50 in the thickness direction as well. Thus, it is possible to reduce an operating resistance load and improve operability even if an operating force is applied to the paper discharging tray 30 at any operating position to move the same.

Figure 10:
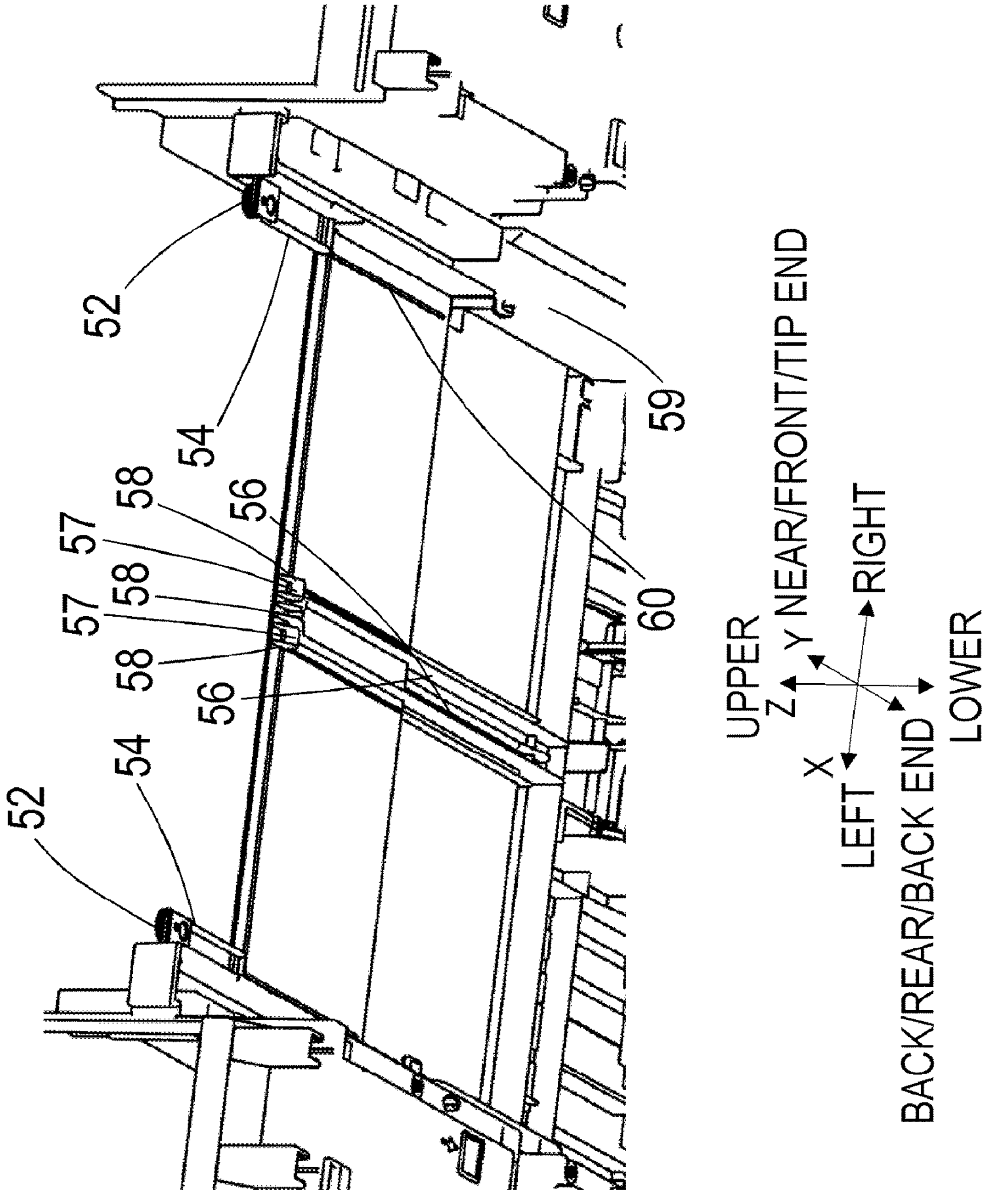
FIG. 10 is a perspective view partially showing a schematic configuration on the rear side of the paper stack surface of the base member.

FIG. 10 is a view of the apparatus near side of the base member 50 when seen from its lower side. At the center on the lower surface side of the paper stack surface 51, the pair of wall surfaces 56 composed of the ribs extending in the Y-direction are formed. Further, at the center on the lower surface side and at the end on the apparatus near side of the paper stack surface 51, a wall surface 57 having a surface that is perpendicular to the Y-direction and directed to the back side of the apparatus main body is provided. On the further apparatus near side of the wall surface 57, a plurality of triangle ribs 58 gradually narrowing from the lower end of the wall surface 57 to the near side are provided. Lateral walls 59 of the accommodation portion of the paper discharging tray 30 that are provided on the right and left sides in the width direction extend in the Y-direction. On the apparatus main body near side of the lateral walls 59, the canopies 54 are integrally formed on the base member 50. Near the right and left ends of the lower surface of the paper stack surface 51, the downwardly-directed ribs 60 are provided.

The relationships between the respective structures of the base member 50 and the paper discharging tray 30 will be especially described.

Figure 11:
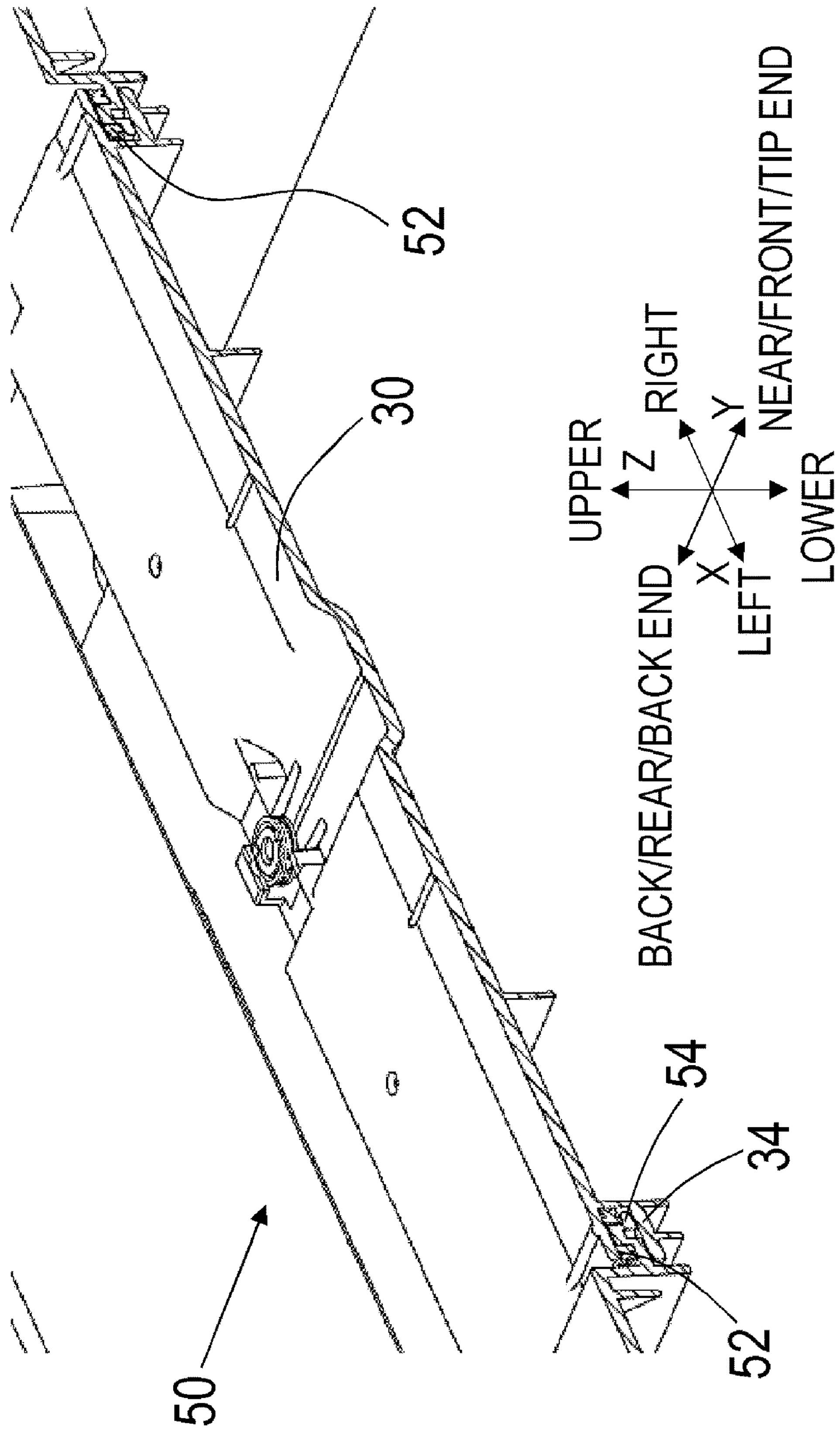
FIG. 11 is a partially cross-sectional perspective view showing the outline of the configuration of the engagement between the paper discharging tray and the base member.

FIG. 11 is a partially cross-sectional perspective view showing a state in which the recessed portions 34 of the paper discharging tray 30 are fitted into the contact rollers 52 and the canopies 54 of the base member 50. The contact rollers 52 and the canopies 54 are held between the upper surfaces 34*a* and the lower surfaces 34*c* of the recessed portions 34 in the Z-direction. Thus, in a state in which the paper discharging tray 30 is embedded in the base member 50 as shown in FIGS. 3 and 4, the contact rollers 52 are pivotally supported without coming off the base member 50, and the paper discharging tray 30 is supported in the Z-direction with respect to the base member 50. By such a configuration, a part of the base member 50 is held at both ends in a direction orthogonal to the slide movement direction of the paper discharging tray 30 by the upper surfaces 34*a* and the lower surfaces 34*c* of the recessed portions 34 serving as a pair of ribs of the paper discharging tray 30 in the thickness direction of the plate shape of the paper discharging tray 30. Thus, it is possible to easily position the paper discharging tray 30 with respect to the base member 50 and realize an apparatus configuration excellent in operability. Moreover, in FIG. 11, the right and left lateral surfaces 34*b* of the paper discharging tray 30 are held between the right and left contact rollers 52. Thus, the paper discharging tray 30 is accurately supported in the Y-direction with respect to the base member 50.

Figure 12:
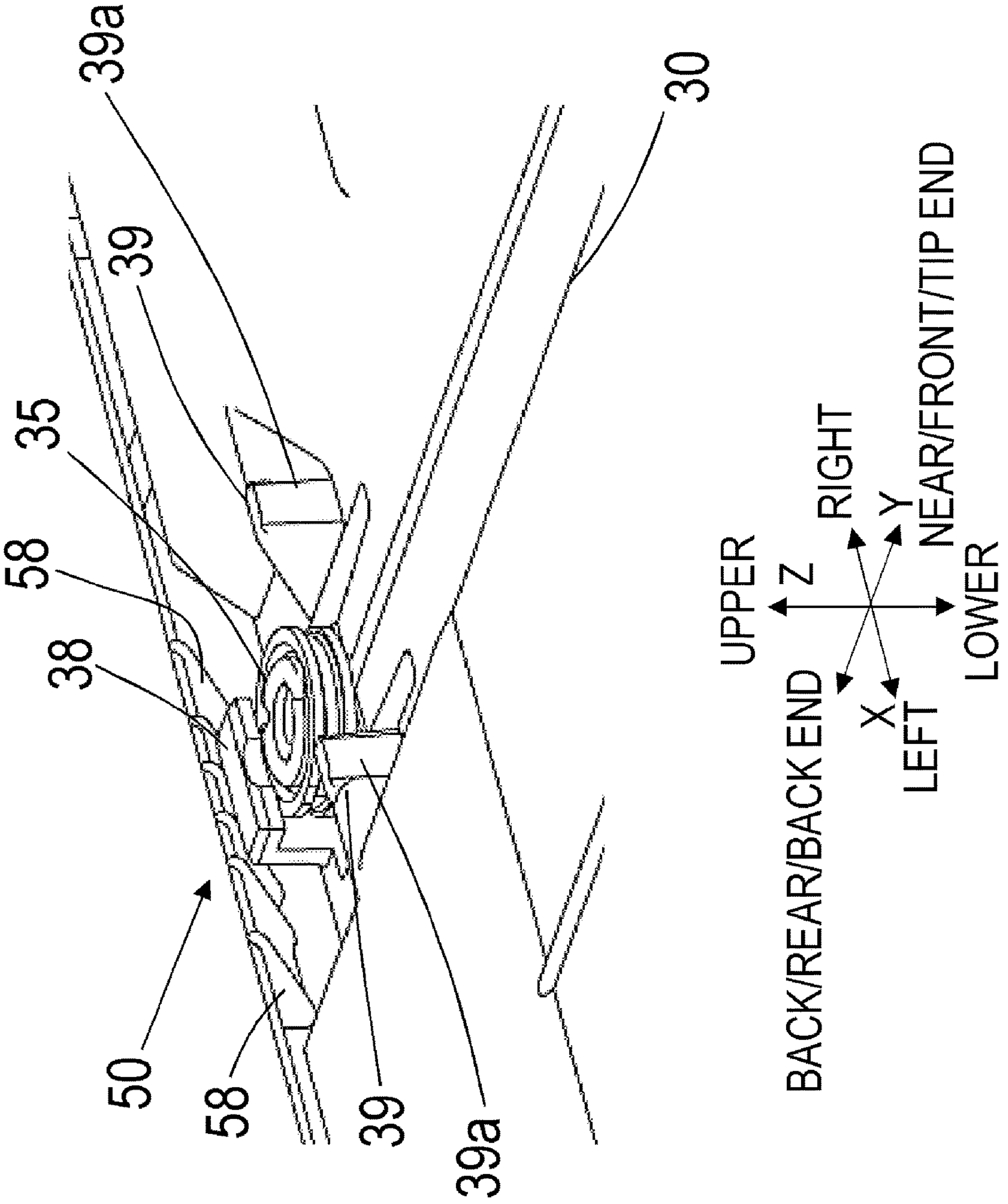
FIG. 12 is a perspective enlarged view showing the outline of the configuration of the engagement between the paper discharging tray and the base member.

FIG. 12 is a perspective view showing the configuration of the periphery of the contact roller 35 in an enlarged fashion when the paper discharging tray 30 is pressed to the back side with respect to the base member 50 from the state shown in FIG. 11. Here, the hooking portion 38 and the protruded portions 39 interfere with the wall surface 57 (FIG. 10) in the Z and X directions. That is, the hooking portion 38 contacts the triangle ribs 58 of the base member 50. When the paper discharging tray 30 is further pressed in this state, the hooking portion 38 and the protruded portions 39 slide to the triangle ribs 58 and the rear ends of the paper stack surface 51 and the paper discharging tray 30 are mutually curved like a bow. Then, the contact roller 35 and the protruded portions 39 climb over the triangle ribs 58, and the surfaces 39*a* of the protruded portions 39 are positioned closer to the back side of the apparatus than the wall surface 57. Thus, the above curvature is cancelled. As a result, the paper discharging tray 30 is prevented from coming off the base member 50 to the near side in the Y-direction. As described above, the surfaces perpendicular to the slide movement direction of the paper discharging tray 30 are provided in the base member 50 and the paper discharging tray 30 and butted against each other. Thus, it is possible to realize a stopper mechanism on the drawing side of the paper discharging tray 30 with respect to the base member 50 with a simple configuration.

Further, when a portion on the near side of the paper discharging tray 30 is lifted in the Z-direction in the drawn state shown in FIG. 4, the lower surfaces 34*c* of the recessed portions 34 contact the lower ends of the butted surfaces 54*a* and the upper surfaces 34*a* contact the protruded surfaces 55 to restrict the rotation of the paper discharging tray 30 in an upper direction. Since the interference between the protruded portions 39 and the wall surface 57 in the Z-direction is maintained in this state, the paper discharging tray 30 is prevented from coming off the base member 50.

Figure 14:
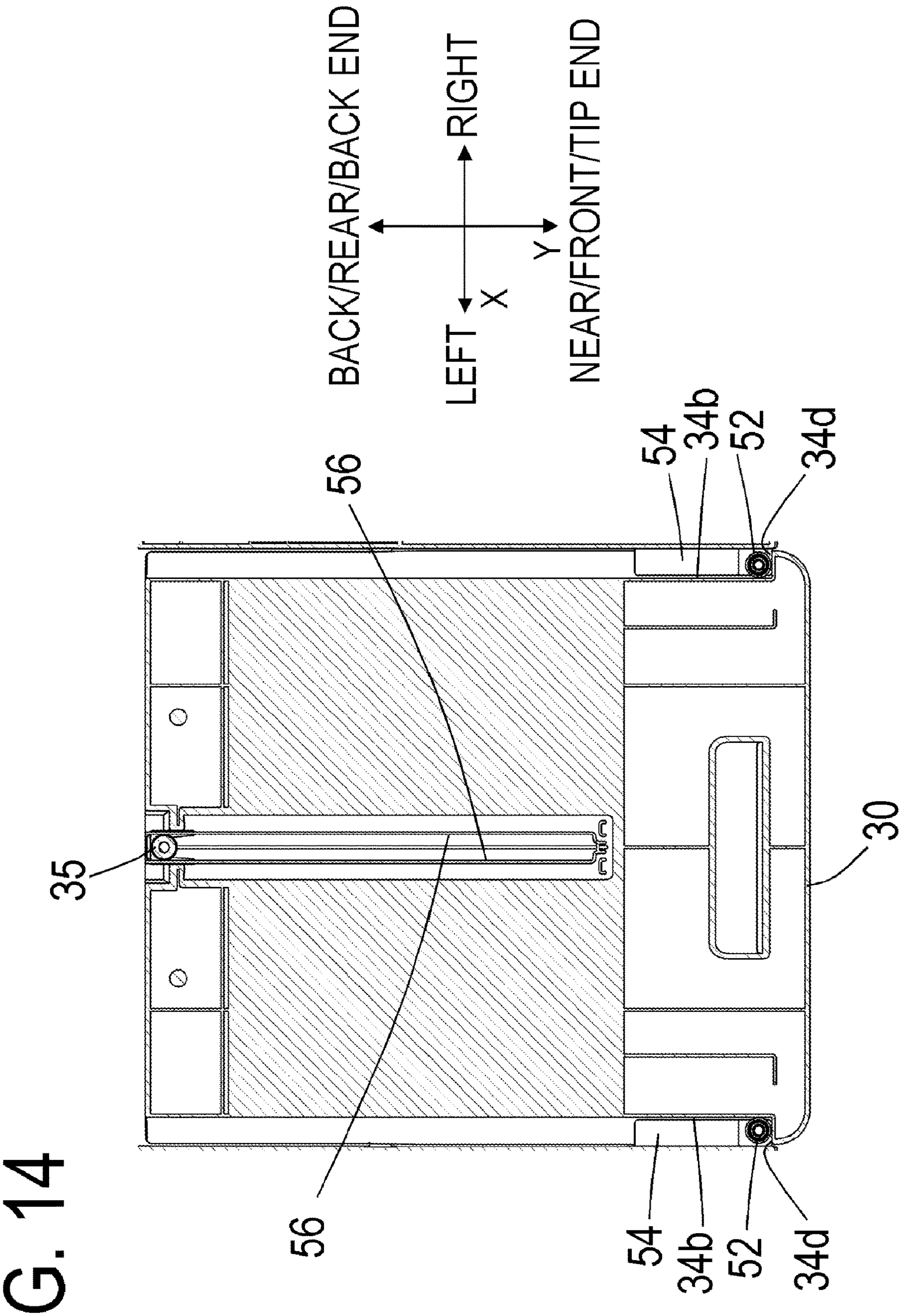
FIG. 14 is a partially cross-sectional view of the paper discharging tray in an accommodated state and the base member.

FIG. 14 is a schematic cross-sectional view of the configurations of the contact portions between the paper discharging tray 30 and the base member 50 when downwardly seen in the Z-direction in a cross section parallel to the X and Y directions in a state in which the paper discharging tray 30 is accommodated in the accommodation portion on the back side of the paper stack surface 51 of the base member 50 as shown in FIG. 3. Note that FIG. 14 shows only configurations near the various portions of the base member 50 that contact the paper discharging tray 30. As shown in FIG. 14, the right and left lateral surfaces 34*b* of the recessed portions 34 of the paper discharging tray 30 are held between the right and left contact rollers 52 of the base member 50 in the X-direction, and a position in the X-direction of the paper discharging tray 30 with respect to the base member 50 is determined by the above relationship between the right and left lateral surfaces 34*b* and the right and left contact rollers 52. Further, the contact roller 35 of the paper discharging tray 30 is held between the pair of wall surfaces 56 provided on the rear surface of the paper stack surface 51 of the base member 50, and the rotation of the paper discharging tray 30 with respect to the base member 50 is restricted in the X-direction. Further, the surfaces 34*d* of the recessed portions 34 of the paper discharging tray 30 contact the butted surfaces 54*a* of the canopies 54 of the base member 50 in the Y-direction and determine the deepest accommodation position of the paper discharging tray 30 with respect to the base member 50.

Figure 15:
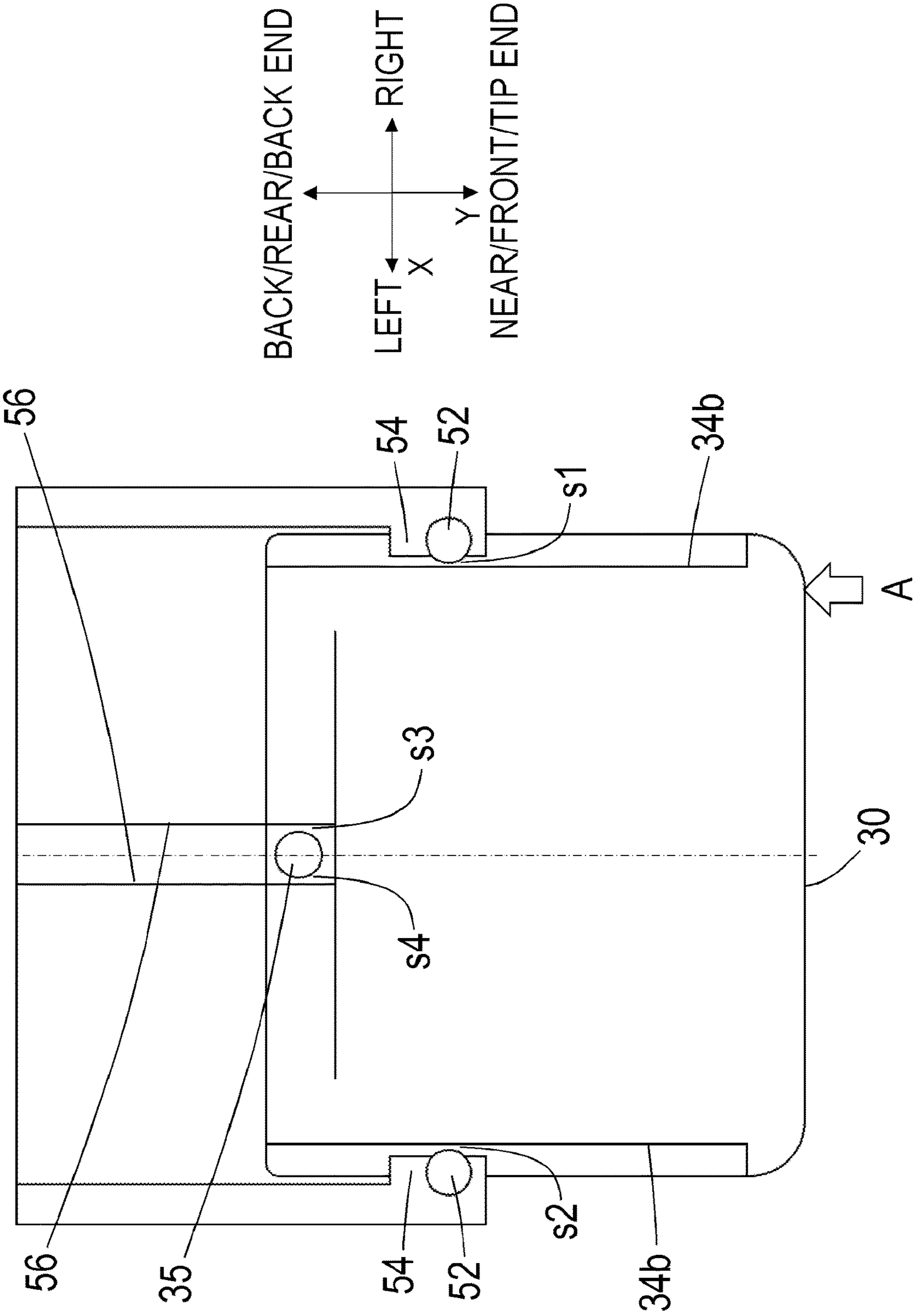
FIG. 15 is a partially cross-sectional view of the paper discharging tray in a drawn state and the base member.

FIG. 15 is a schematic cross-sectional view of the configurations of the contact portions between the paper discharging tray 30 and the base member 50 when downwardly seen in the Z-direction in a cross section parallel to the X and Y directions in a state in which the paper discharging tray 30 is drawn from the base member 50 as shown in FIG. 4. In this case as well, the right and left lateral surfaces 34*b* of the recessed portions 34 of the paper discharging tray 30 are held between the right and left contact rollers 52 of the base member 50 in the X-direction, and a position in the X-direction of the paper discharging tray 30 with respect to the base member 50 is determined by the above relationship between the right and left lateral surfaces 34*b* and the right and left contact rollers 52 like the case shown in FIG. 14. Further, the contact roller 35 of the paper discharging tray 30 is drawn in the Y-direction together with the paper discharging tray 30 in this state. However, like the case shown in FIG. 14, the contact roller 35 is held between the pair of wall surfaces 56 provided on the rear surface of the paper stack surface 51 of the base member 50. That is, the rotation of the paper discharging tray 30 with respect to the base member 50 is restricted in the X-direction.

Further, in the state shown in FIG. 15, the near-side portion of the paper discharging tray 30 is supported in a largely-protruded state. As shown in FIG. 15, about more than half portion of the paper discharging tray 30 is configured to be protruded into the air from the front surface of the base member 50, and the paper discharging tray 30 is capable of supporting a paper of a larger size together with the paper stack surface 51 of the base member 50. Here, the near-side portion of the paper discharging tray 30 is likely to sag, but the upper surfaces 34*a* of the recessed portions 34 are supported by the thrust surfaces of the contact rollers 52 and the protruded surfaces 41 provided near the corner portions at the rear end are butted against the ribs 60, whereby the sagging of the near-side portion of the paper discharging tray 30 is prevented. As described above, the paper discharging tray 30 is butted against the base member 50 at its both ends and central portion, components having a low frictional coefficient or the like are provided at butted portions. Moreover, the paper discharging tray 30 is butted against the base member 50 in its thickness direction as well, and rotatable rollers are used as the components. Thus, it is possible to reduce an operating resistance load and improve operability even if an operating force is applied to the paper discharging tray 30 at any operating position to move the same.

The mechanism of the operation of the paper discharging tray 30 with respect to the base member 50 based on the above relationships between the respective structures will be described in detail.

In the accommodated state of the paper discharging tray 30 as shown in FIGS. 1, 3, and 14, the paper discharging tray 30 is drawn from the base member 50 to the front side of the apparatus main body with the handle 31 gripped. At this time, the paper discharging tray 30 is straightly drawn with the center of the handle 31 gripped, whereby the drawn state of the paper discharging tray 30 as shown in FIGS. 2, 4, and 15 is created. The handle 31 is configured to be recessed so that the surface for hooking a user's finger or the like is substantially the same in height as various sliding contact portions such as the contact rollers 52 between the paper discharging tray 30 and the base member 50, and capable of effectively transmitting an operating force to the paper discharging tray 30.

Here, since the surfaces 39*a* of the protruded portions 39 of the paper discharging tray 30 are butted against the wall surface 57 of the base member 50, the drawing operation of the paper discharging tray 30 is stopped (restricted) by the contact between the surfaces 39*a* and the wall surface 57 in the near-side direction of the apparatus main body. The paper discharging tray 30 is pressed in the depth direction of the apparatus main body with the handle 31 or the like gripped again in this state, whereby it is possible to restore the accommodated state of the paper discharging tray 30 as shown in FIG. 14 or the like.

Figure 16:
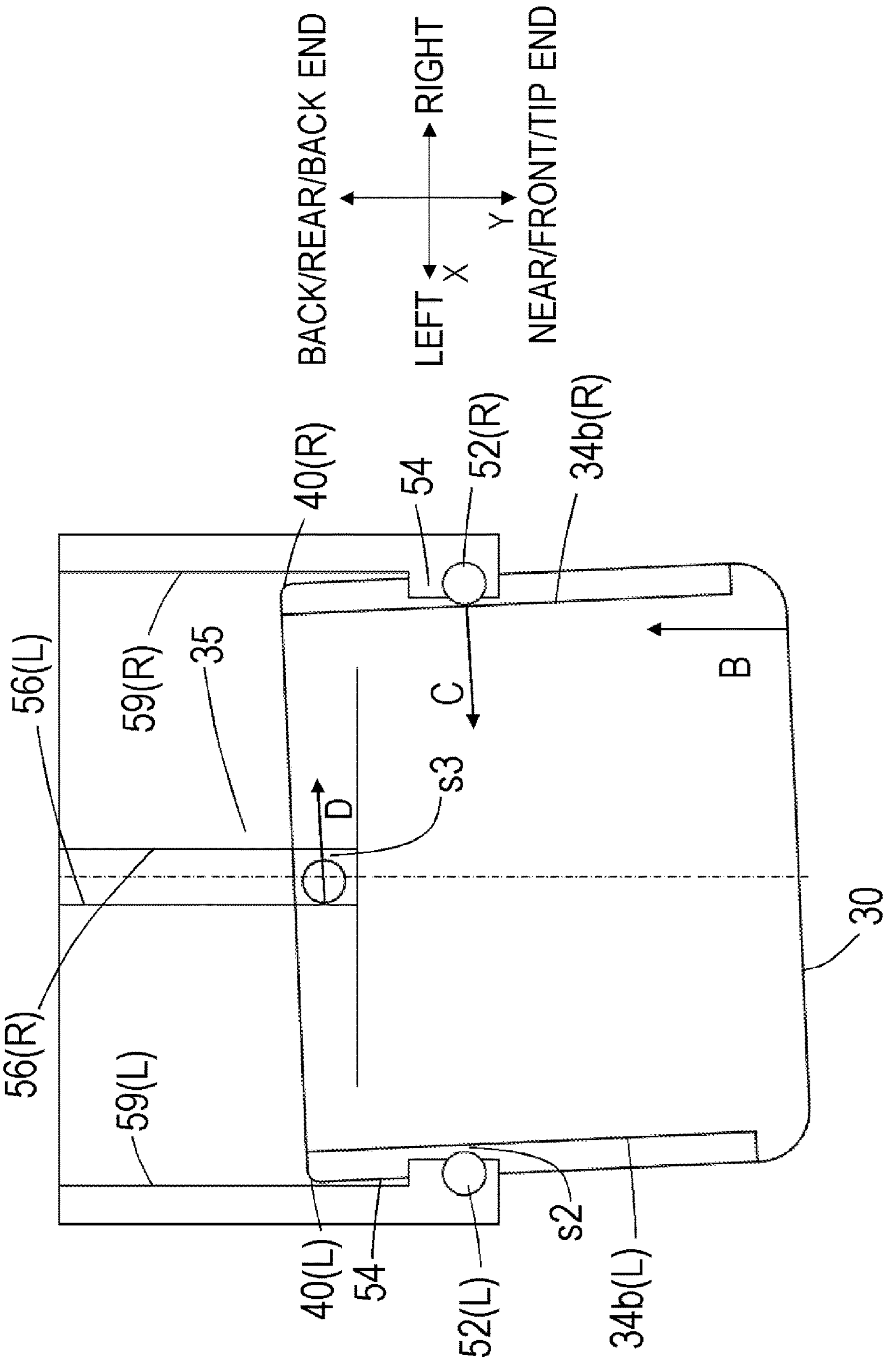
FIG. 16 is a partially cross-sectional view of the paper discharging tray skewing when the paper discharging tray is pressed and the base member.

Meanwhile, in a case in which a prescribed gap s1 is provided between the right contact roller 52 in the width direction and the right lateral surface 34*b* of the recessed portion 34 when the paper discharging tray 30 is accommodated by pressing a spot indicated by an arrow A as shown in FIG. 15, the paper discharging tray 30 possibly skews with respect to the base member 50. That is, by the contact resistance or the like between the left contact roller 52 and the upper surface 34*a* of the left recessed portion 34, the paper discharging tray 30 is inclined counterclockwise with respect to the base member 50 as shown in FIG. 16. At this time, the right lateral surface 34*b*(R) among the lateral surfaces of the paper discharging tray 30 contacts the right contact roller 52(R) among the contact rollers of the base member 50. Note that (R) is a symbol used for the sake of convenience. (R) indicates a right side, and (L) indicates a left side. Further, in a case in which a prescribed gap s4 is provided between the left side of the contact roller 35 of the paper discharging tray 30 and the left wall surface 56 of the base member 50 as shown in FIG. 15, the left side of the contact roller 35 of the paper discharging tray 30 contacts the wall surface 56(L) as shown in FIG. 16. At the same time, the left lateral surface 34*b*(L) of the paper discharging tray 30 is separated from the left contact roller 52(L) of the base member 50, and the contact roller 35 of the paper discharging tray 30 is also separated from the wall surface 56(R). That is, even when the paper discharging tray 30 is shifted from the state of FIG. 15 to the state of FIG. 16, the respective gaps s2 and s3 are secured. Moreover, at this time, the right lateral wall 59(R) of the base member 50 is separated from the right rear-end corner portion 40(R) of the paper discharging tray 30, and the left lateral wall 59(L) of the base member 50 is separated from the left rear-end corner portion 40(L) of the paper discharging tray 30. Accordingly, main forces acting on the paper discharging tray 30 inside X and Y planes are forces indicated by B, C, and D in FIG. 16. The components of the forces C and D in the Y-direction cancel each other, and a force in the X-direction is most affected by the force indicated by B. The force indicated by B is generated when an operation is made. Therefore, the component of a force generated in a direction indicated by A is consumed to some degree to tighten up the looseness of the gaps but mostly used for the slide accommodating operation of the paper discharging tray 30. Consequently, the operating force is efficiently converted into the movement operation of the paper discharging tray 30. Therefore, it is possible to realize a drawing configuration that achieves a light operating feeling.

The couple application mechanism (a rotation restriction mechanism or an angle restriction mechanism) that contributes to the above light operating feeling will be described with reference to FIGS. 17A to 17D. FIGS. 17A to 17D are schematic cross-sectional views for describing the operation of the couple application mechanism in the present embodiment and show a state in which the skewing of the paper discharging tray 30 is corrected as the pressing amount of the paper discharging tray 30 into the base member 50 increases in chronological order (from FIG. 17A to FIG. 17D).

Figures 17A, 17B, 17C, 17D:
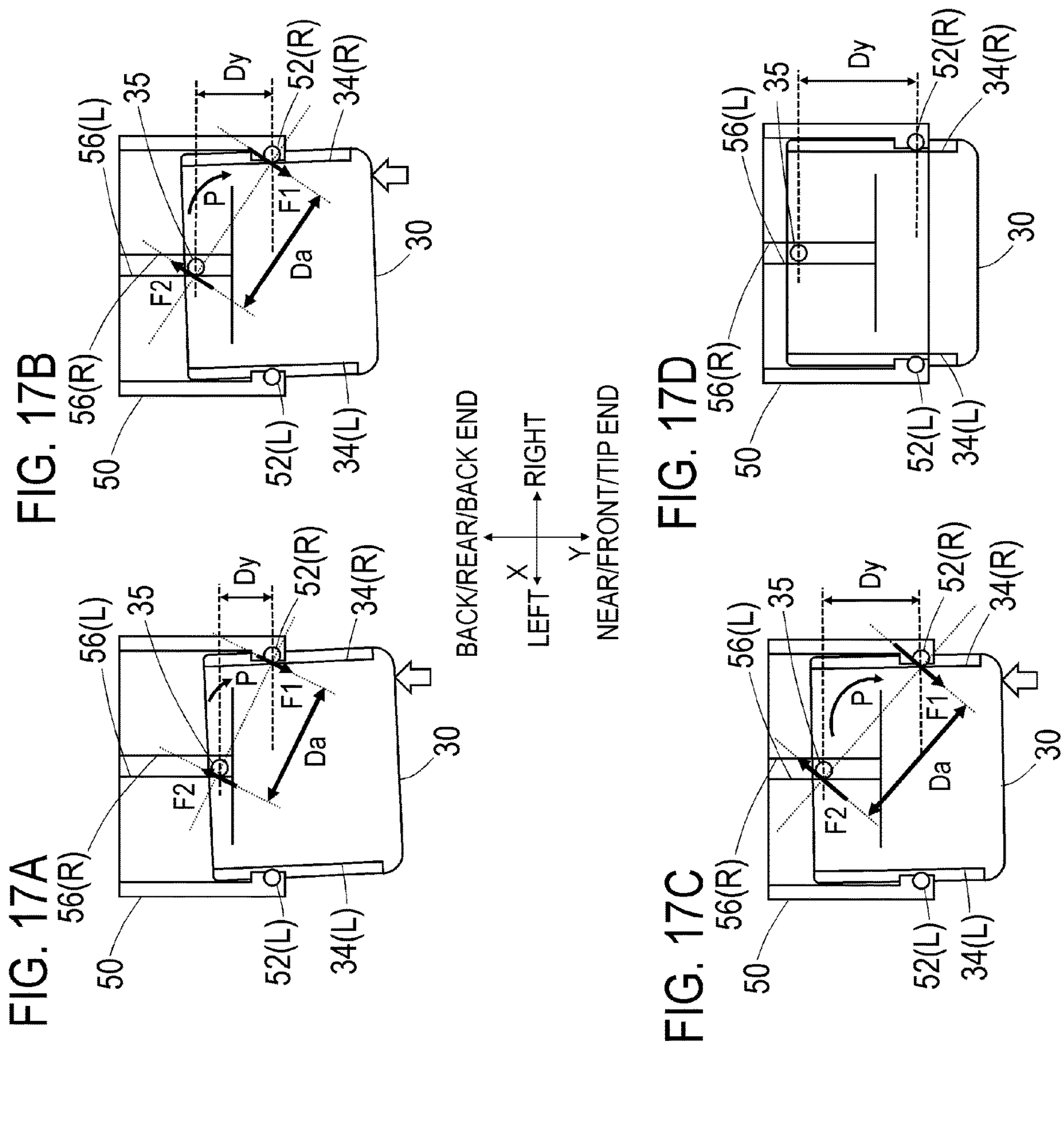
FIGS. 17A to 17D are schematic cross-sectional views for describing a couple application mechanism.

As shown in FIGS. 17A to 17C, a couple P for correcting the skewing of the paper discharging tray 30 with respect to the reciprocating direction is generated in the paper discharging tray 30 as the reaction of a force by which the paper discharging tray 30 is pressed into the base member 50. The couple P is generated by the action of two forces F1 and F2 that are parallel, opposite, and equal to each other and applied to the paper discharging tray 30 by contact portions at two contacting spots between the paper discharging tray 30 and the base member 50 during the skewing. When the paper discharging tray 30 skews with its upper right side raising as shown in the figures, the force F1 (one force or a first couple forming force) is applied by the contact between the right contact roller 52(R) and the recessed portion 34(R) and the force F2 (the other force or a second couple forming force) is applied by the contact between the left wall surface 56(L) and the left side of the contact roller 35.

Here, in the case of a skewing state shown in FIGS. 17A to 17D, the contact portion between the contact roller 52(R) and the recessed portion 34(R) corresponds to a first couple application portion in the present invention and the contact portion between the left wall surface 56(L) and the left side of the contact roller 35 corresponds to a second couple application portion in the present invention. The recessed portions 34 are provided so as to extend in the longitudinal direction between one end and the other end in the longitudinal direction of the paper discharging tray 30. The paper discharging tray 30 is pressed into the base member 50 with the one end and the other end in the longitudinal direction positioned on the back side and the near side in a pressing direction, respectively. Accordingly, the contact position (the first contact position or the first restriction position of the first couple application portion) between the contact roller 52(R) provided on the base member 50 and the recessed portion 34(R) relatively changes in a reciprocating direction with the reciprocation of the paper discharging tray 30. Meanwhile, the left wall surface 56(L) of the base member 50 is provided so as to extend in the reciprocating direction of the paper discharging tray 30. Accordingly, the contact position (the second contact position or the second restriction position of the second couple application portion) between the left wall surface 56(L) and the left side of the contact roller 35 relatively changes in the reciprocating direction with the reciprocation of the paper discharging tray 30. By the above relative change in the first contact position of the first couple application portion and the above relative change in the second contact position of the second couple application portion, the distance between the first contact position and the second contact position is changed mutually. When the paper discharging tray 30 moves in the pressing direction, the first contact position and the second contact position are separated from each other in the reciprocating direction.

In the case of a skewing state opposite to the skewing state shown in FIGS. 17A to 17D, the contact portion between the contact roller 52(L) and the recessed portion 34(L) corresponds to a third couple application portion in the present invention, and the contact portion between the right wall surface 56(R) and the right side of the contact roller 35 corresponds to a fourth couple application portion in the present invention. The descriptions of the third contact position or the third restriction position of the third couple application portion and the fourth contact position or the fourth restriction position of the fourth couple application portion are the same as those of the first contact position of the first couple application portion and the second contact position of the second couple application portion and will be therefore omitted.

As shown in FIGS. 17A to 17D, the position of the contact portion between the contact roller 52(R) and the recessed portion 34(R) is maintained at the same position in the reciprocating direction of the paper discharging tray 30 regardless of the pressing amount of the paper discharging tray 30 with respect to the base member 50. On the other hand, the position of the contact portion between the left wall surface 56(L) and the left side of the contact roller 35 moves to the back side in the pressing direction as the pressing amount increases. That is, a distance Dy in the pressing direction between the two contact portions increases in the pressing direction as the pressing amount increases. Accordingly, a distance Da between the action lines of the two forces F1 and F2 generating the couple P becomes large as the pressing amount of the paper discharging tray 30 increases. The couple P also increases as the distance Da between the action lines of the forces F1 and F2 becomes large.

Further, as shown in FIGS. 17A to 17D, the contact portion between the right lateral surface 34*b*(R) and the right contact roller 52(R) is separated from the contact roller 35 in the depth direction as the paper discharging tray 30 is accommodated. At this time, if the prescribed gap between the contact roller 35 and the wall surface 56 and the prescribed gap between lateral surface 34*b* and the contact roller 52 are constant in the depth direction, the inclination direction of the paper discharging tray 30 becomes close to a direction parallel to the Y-direction as the paper discharging tray 30 is accommodated. Thus, a resistance force accompanied by the movement of the paper discharging tray 30 is reduced. As a result, an operating force is also reduced. That is, a load on the pressing operation of the paper discharging tray 30 is reduced by the setting of the gaps in the width direction between the paper discharging tray 30 and the base member 50, the application of a couple, or the like described above as the pressing amount of the paper discharging tray 30 increases. As a result, the effect of lightening an operating feeling is obtained.

In the present embodiment, the contact rollers 52 are provided at the contact portions of the base member 50. Each of the contact rollers 52 is rotated when a force indicated by E is generated as shown in FIG. 9, and resistance during sliding is reduced. Moreover, each of the upper surfaces 34*a* of the recessed portions 34 is inclined by a slight angle in the direction of the lateral surface as shown in FIG. 13. Therefore, the upper surface 34*a* is butted against only the thrust surface close to the center of the contact roller 52 as shown in FIG. 9. Thus, a force indicated by F is generated in the contact roller 52 as shown in FIG. 9. By the rotation of the contact roller 52, resistance to the pressing operation of the paper discharging tray 30 is further reduced. As a result, an operating force is reduced. As described above, the paper discharging tray 30 is butted against the base member 50 at its both ends, and components having a low frictional coefficient or the like (having sliding resistance to the pressing operation of the paper discharging tray 30 that is relatively lower than sliding resistance at other sliding portions) are provided at butted portions. Moreover, the paper discharging tray 30 is butted against the base member 50 in its thickness direction as well, rotatable rollers are used as the components, and the butted surfaces on the side of the drawing member are slightly inclined. With the above configurations, it is possible to reduce an operating resistance load and improve operability even if an operating force is applied to the paper discharging tray 30 at any operating position to move the same.

In the above description, the paper discharging tray 30 is inclined with respect to the base member 50 when the spot indicated by A is pressed. However, the paper discharging tray 30 exhibits the same behavior even when the spot, which is symmetrically identical to the spot of A, on the left side of the paper discharging tray 30 is pressed. Further, when a spot close to the center of the paper discharging tray 30 between the spot indicated by A and the opposite spot on the left side is pressed, a force generating the inclination of the paper discharging tray 30 is reduced. As a result, an operating force is further reduced correspondingly. In the present embodiment, the curvature radii of right and left corners on the tip end side of the paper discharging tray are made large, and the region of a plane portion on the near side is positioned close to the center of the apparatus main body. Thus, it is possible to shift the spot indicated by A or the opposite spot on the left side to an inside to further reduce an operating force.

Here, in the slide mechanism of a conventional paper discharging tray or the like, a square plate-shaped component is generally relatively moved in a prescribed direction. In this case, it is likely that the paper discharging tray is inclined with respect to the prescribed direction to cause a significant increase in an operating force. This is because the paper discharging tray seems to contact a base member at a place distant from an operating spot. Therefore, it is necessary to perform the change of a hand to grip the paper discharging tray to perform an operation again or the like. As a result, operability is degraded in some cases.

A slide-type paper discharging tray proposed in Japanese Patent Application Laid-open No. H04-39259 includes a main tray and an auxiliary tray slidably attached to the main tray, and a paper discharged from an apparatus main body is stacked on the slide-type paper discharging tray. One of the main tray and the auxiliary tray has first slide guides at both lateral portions in a width direction and the portion between both lateral portions. Further, the other of the main tray and the auxiliary tray has second slide guides that slidably engage the first slide guides. Further, a drawing mechanism proposed in Japanese Patent Application Laid-open No. 2008-287247 includes rail portions movable with respect to a frame, and a plurality of rotating rollers that hold the rail portions in a width direction and a height direction are arranged on the frame portion.

However, in the configuration of the paper discharging tray of Japanese Patent Application Laid-open No. H04-39259, the guides are provided at both ends in the width direction and one spot between both ends, that is, at totally three spots. Therefore, operability during the pressing operation of the auxiliary tray becomes excellent. The positional relationship between the respective slide guides is not described. When an operator presses an arbitrary position during the pressing operation of the auxiliary tray, the auxiliary tray is inclined in the width direction. Therefore, there is a case that one of the main tray and the auxiliary tray increases a span in the width direction between the slide guides of the other of the main tray and the auxiliary tray. A frictional force generated by such an inclination state may degrade the operability of the trays. For example, in the configuration shown in FIG. 4 of Japanese Patent Application Laid-open No. H04-39259, a surface 36*a* of the main tray 30 and the opposed surface of the auxiliary tray 31 contact each other on both sides when the auxiliary tray 31 is rotated and inclined in a counterclockwise direction. In this state, a force is applied to press a gripping portion 44 so as to be thrusted and further rotate the same in a counterclockwise direction.

Further, in the drawing mechanism of Japanese Patent Application Laid-open No. 2008-287247, at least two rollers may be provided in the description of a modified embodiment. However, when the rails are held only by two rollers, it is assumed that the rails are significantly inclined due to the prescribed looseness between the rails and the rollers. Therefore, as described in the best mode, it is assumed that at least four rollers (two rollers in the width direction and two rollers in the drawing direction of the rails) are required. The rollers are arranged at substantially outermost positions in the width direction of the drawing rails. Therefore, if the arrangement distance between the rollers in the drawing direction are not separated from each other as much as possible when the width of a drawer is large, there is a likelihood that the rail portions are largely inclined. On the other hand, if the arrangement distance between the rollers in the drawing direction is made large, there is a concern that a distance to perform a drawing operation is reduced when the drawer is held at all times by both rollers in the drawing direction.

As opposed to the drawing mechanisms disclosed in Japanese Patent Application Laid-open No. H04-39259 and Japanese Patent Application Laid-open No. 2008-287247, the drawing mechanism of the present embodiment is configured so that the base member and the drawing member are butted against each other with the prescribed gaps at their both ends and central portion in the direction orthogonal to the slide movement direction. Thus, when the drawing member is inclined with respect to the base member in the slide operation of the drawing member, the base member and the drawing member are butted against each other only on a side close to an operating portion and at a central portion to prevent an increase in an operating resistance load. That is, it is possible to realize a drawing configuration that reduces an operating resistance load and is excellent in operability even if an operating force is applied to the drawing member at any operating position to move the same.

In the present embodiment, the right and left contact portions are arranged at the same position in the drawing direction of the paper discharging tray 30, but they may be arranged at different positions in the front-and-rear direction for some reasons on design or the like without departing from the above description contents. Further, a pair of the couple application portions (the first and second couple application portions) for correcting the skewing of the paper discharging tray 30 that skews with its upper right side raising and a pair of the couple application portions (the third and fourth couple application portions) for correcting the skewing of the paper discharging tray 30 that skews with its left upper side raising are arranged so as to cross each other in the right-and-left direction, but they may be arranged so as not to cross each other in the right-and-left direction. That is, the former pair of the couple application portions may be arranged close to the right side, and the latter pair of the couple application portions may be arranged close to the left side. Further, relative arrangements in the right-and-left direction and the drawing direction of the couple application portions in the respective pairs of the couple application portions may be different for each of the pairs.

Note that the present embodiment does not describe the contact condition between the thrust surface of the contact roller 35 of the paper discharging tray 30 and the lower surface of the paper stack surface 51 of the base member 50. However, it is possible to further reduce an operating force by the use of the contact condition. Further, each of the dimensions of the inner and outer diameters, the height, the thrust surface, or the like of the contact rollers in the present embodiment may be uniform or different. Further, the shape of the contact rollers is not limited to a cylinder but may be a cone or the like, and the support shafts of the contact rollers may not be perpendicular. The contact rollers are implementable not only in the above mode of the embodiment but also in an arbitrary mode.

Each of right and left contact portions and a central contact portion is formed by a wall shape and a butted shape as the drawing configuration of a slide-type tray as described above, whereby it is possible to provide a simple and inexpensive configuration. Note that the present embodiment describes the recording apparatus as an example to which the present invention is applied. However, the present invention is also applicable to the drawing configurations of various products having image recording unit. That is, the application of the present invention is not limited to a drawing mechanism such as a paper discharging tray, but the present invention is suitably applicable to various drawing mechanisms capable of relatively taking a drawn state and an accommodated state in a prescribed advancing and retracting direction.

According to the present invention, it is possible to improve operability in the pressing of a drawing member into a base member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023459, filed on Feb. 17, 2021, which is hereby incorporated by reference herein in its entirety.

What is claimed is:

1. A drawing apparatus comprising:

a base member; and a drawing member that is attached so as to be capable of being drawn and pressed in a reciprocating direction with respect to the base member, the drawing member including a first contact member on a downstream side of a pressing direction in the reciprocating direction;

wherein the base member includes a pair of wall surfaces provided so as to extend along the reciprocating direction, the pair of wall surfaces being provided so as to face each other in a width direction orthogonal to the reciprocating direction and a left right direction of the drawing apparatus;

wherein the drawing member is configured to be drawn from or pressed to the base member in the reciprocating direction in a state where the first contact member is sandwiched between the pair of wall surfaces; and wherein an end portion of the drawing member in the width direction is configured to come into contact with the base member on an upstream side of the pressing direction in the reciprocating direction in a case where the drawing member skews with respect the base member.

2. The drawing apparatus according to claim 1, wherein the pair of wall surfaces are provided with respect to the base member so as to extend downward in a gravity direction.

3. The drawing apparatus according to claim 2, wherein the pair of wall surfaces are configured to abut on the drawing member.

4. The drawing apparatus according to claim 3, wherein the drawing member includes a recessed portion recessed with respect to surroundings, the pair of wall surfaces are configured to abut on the recessed portion.

5. The drawing apparatus according to claim 1, wherein the first contact member is a roller.

6. The drawing apparatus according to claim 1, wherein the first contact member is a roller capable of rotating about a rotating axis line that extends to a direction orthogonal to the reciprocating direction and the width direction.

7. The drawing apparatus according to claim 1, wherein the base member includes two contact members, both end portions of the drawing member in the width direction can come into contact with each of the two contact members of the base member on upstream side of the pressing direction in the reciprocating direction.

8. The drawing apparatus according to claim 7 the drawing member has a recessed portion recessed inward in the width direction, each of the two contact members is in the recessed portion in a case where the drawing member is drawn from or pressed to the base member, an upper surface of the recessed portion extends so as to be inclined in a direction in which an opening width of the recessed portion increases from boundary between the upper surface and a side surface of the recessed portion to lateral side of the base member.

9. The drawing apparatus according to claim 8, wherein the two contact members are rollers capable of rotating about a rotating axis line that extends to a direction orthogonal to the reciprocating direction and the width direction.

10. The drawing apparatus according to claim 7, wherein the two contact members are provided at end portions on upstream side of the pressing direction of the base member in the reciprocating direction.

11. The drawing apparatus according to claim 7, wherein the two contact members are a second contact member and a third contact member, one end portion of both end portions of the drawing member in the width direction comes into contact with the second contact member in a case where the drawing member skews with respect to the base member, the other end portion of both end portions of the drawing member in the width direction comes into contact with the third contact member in a case where the drawing member skews to an opposite side with respect to the base member.

12. The drawing apparatus according to claim 11, wherein the third contact member is configured not to come into contact with the drawing member while the second contact member comes into contact with the drawing member, the second contact member is configured not to come into contact with the drawing member while the third contact member comes into contact with the drawing member.

13. The drawing apparatus according to claim 7, wherein the two contact members are rollers capable of rotating about a rotating axis line that extends to a direction orthogonal to the reciprocating direction and the width direction.

14. The drawing apparatus according to claim 1, wherein a distance between the first contact member and a position where the end portion of the drawing member in the width direction comes into contact with the base member in the reciprocating direction becomes longer as an amount of pressing of the drawing member with respect to the base member is increased.

15. The drawing apparatus according to claim 1, wherein the first contact member is provided at an end portion on downstream side of the pressing direction of the drawing member in the reciprocating direction.

16. A recording apparatus comprising:

a recording portion that records an image on a recording material; and the drawing apparatus according to claim 1, wherein the drawing member drawn from the base member is used as a stacking portion for stacking a recording material in the drawing apparatus.

* * * * *